United States Patent
Pittman et al.

(10) Patent No.: US 7,019,875 B2
(45) Date of Patent: Mar. 28, 2006

(54) METHOD AND APPARATUS FOR SINGLE-PHOTON SOURCE AND QUANTUM MEMORY

(75) Inventors: Todd B. Pittman, Catonsville, MD (US); James D. Franson, Ellicott City, MD (US); Bryan C. Jacobs, Sykesville, MD (US)

(73) Assignee: The John Hopkins University, Baltimore, MD (US)

( * ) Notice: Subject to any disclaimer, the term of this patent is extended or adjusted under 35 U.S.C. 154(b) by 328 days.

(21) Appl. No.: 10/639,559

(22) Filed: Aug. 12, 2003

(65) Prior Publication Data

US 2004/0109633 A1     Jun. 10, 2004

Related U.S. Application Data

(60) Provisional application No. 60/433,072, filed on Dec. 13, 2002, provisional application No. 60/431,835, filed on Dec. 9, 2002.

(51) Int. Cl.
*G06E 3/00*     (2006.01)

(52) U.S. Cl. .................. 359/107; 359/108; 708/191
(58) Field of Classification Search ........ 359/107–108; 708/191, 816, 831
See application file for complete search history.

(56) References Cited

U.S. PATENT DOCUMENTS

2005/0025200 A1 * 2/2005 Santori et al. ............. 372/25

FOREIGN PATENT DOCUMENTS

GB     2378319     * 2/2005

OTHER PUBLICATIONS

Quantum Logic with Light, Glass & Mirrors, A. Shields, www.sciencemag.org, vol. 297, Sep. 13, 2002.
Nonlocality in Quantum Computing, Franson et al., Fortschr. Phys. 46(1998) 6-8, 697-705.
An Optical Approach to Quantum Computing, Franson et al., CP Williams (ED.): QCQC '98, LNCS 1509, pp. 383-390, 1999, © Springer-Verlag Berlin Heidelberg 1999.

* cited by examiner

*Primary Examiner*—Leonidas Boutsikaris
(74) *Attorney, Agent, or Firm*—Francis A. Cooch

(57) ABSTRACT

An optical switch and optical storage loop are used as the basis of a single-photon source and a quantum memory for photonic qubits. To operate as a single-photon source, the techniques include a source of a pair of photons, such as a parametric down-conversion crystal, which is known to emit photons in pairs. The detection of one member of the pair activates the switch, which re-routes the other member into the storage loop. The stored photon is then known to be circulating in the loop, and can be switched out of the loop at a later time chosen by the user, providing a single photon for potential use in a variety of quantum information processing applications. To operate as a quantum memory for photonic qubits, a single-photon in an arbitrary initial polarization state is coherently stored in the loop, and coherently switched out of the loop when needed.

18 Claims, 12 Drawing Sheets

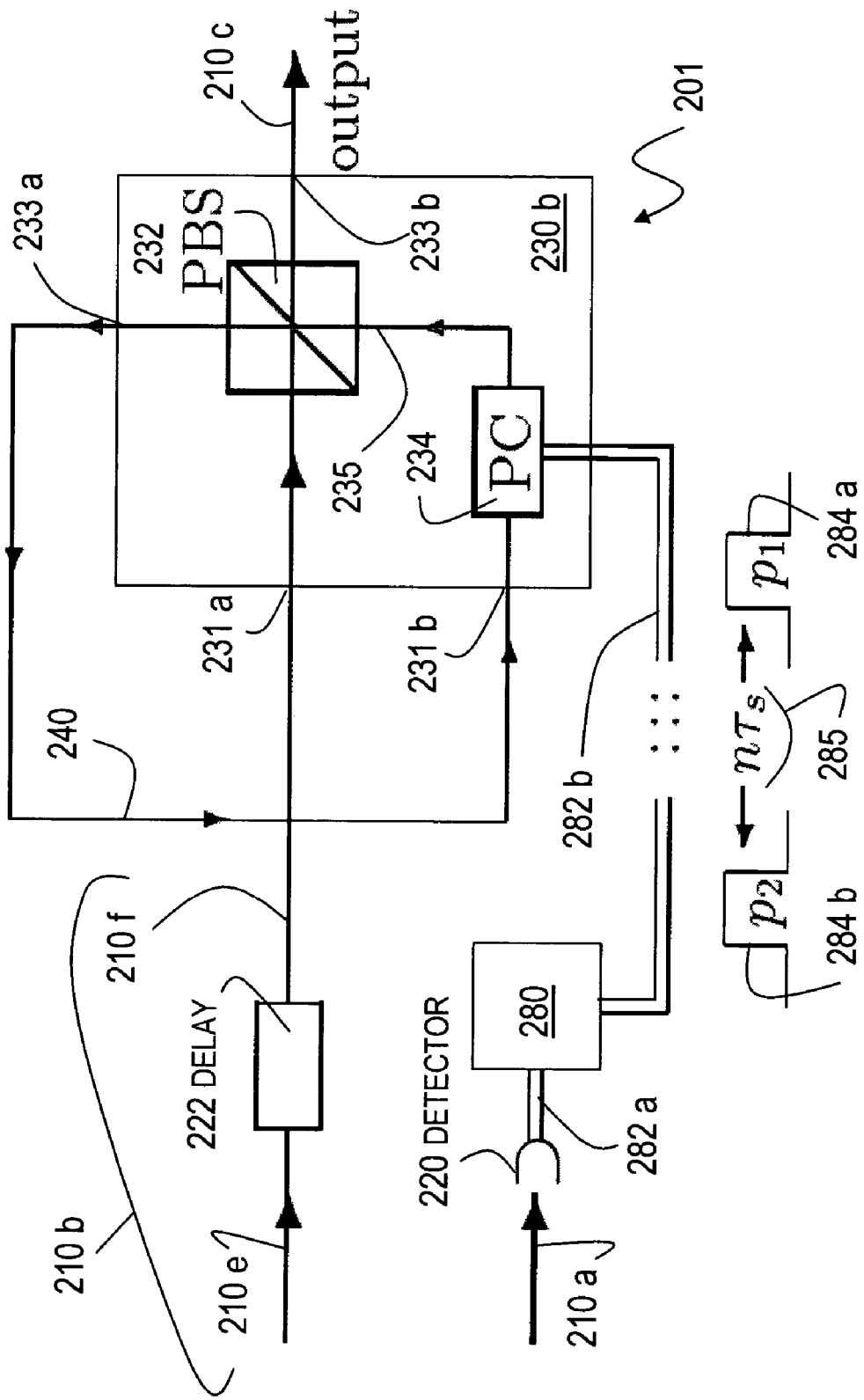

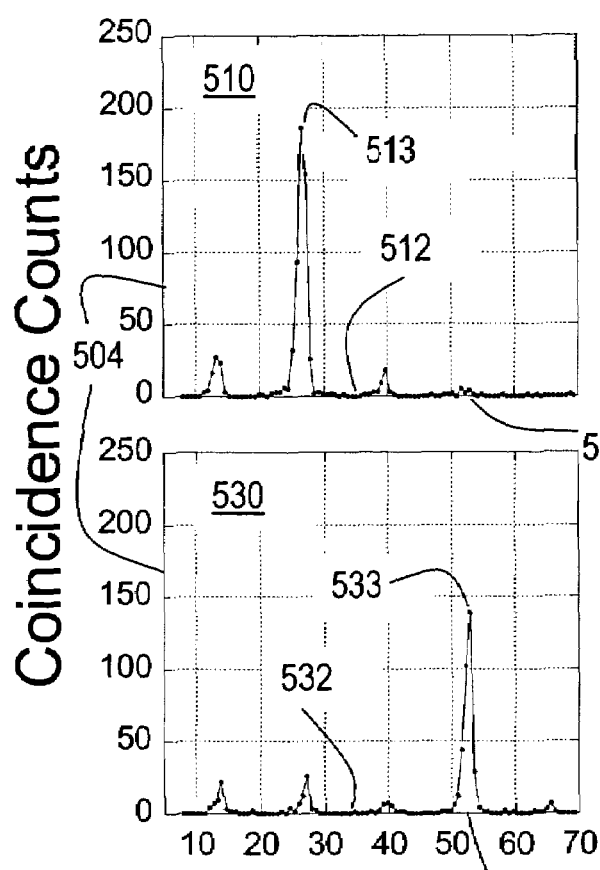

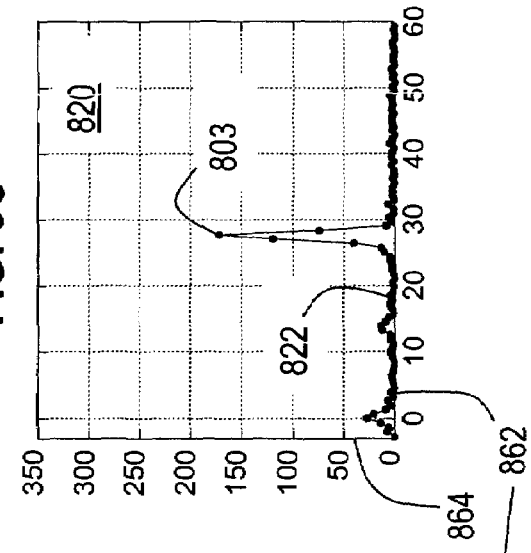
FIG. 8A
FIG. 8B
FIG. 8C
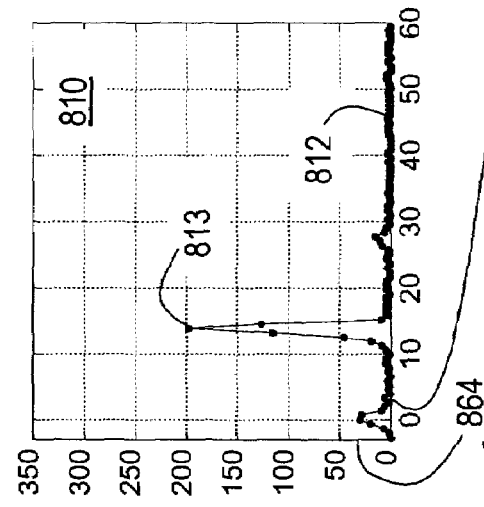
FIG. 8D
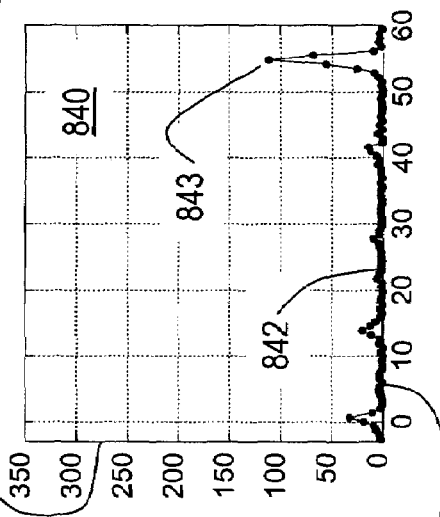
FIG. 8E
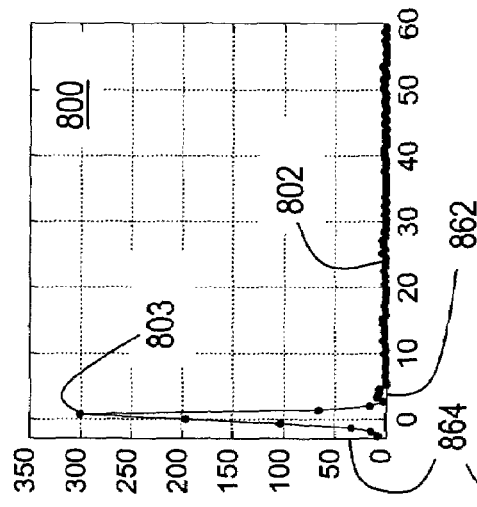
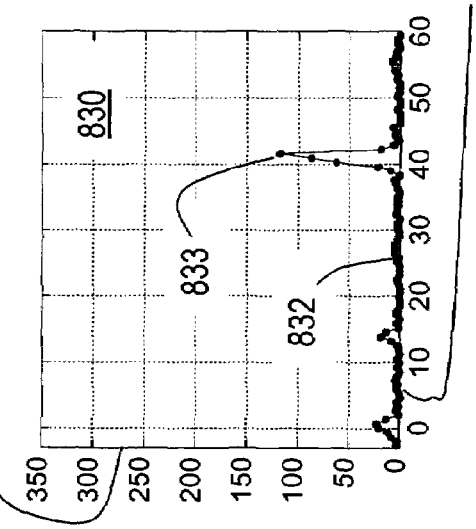

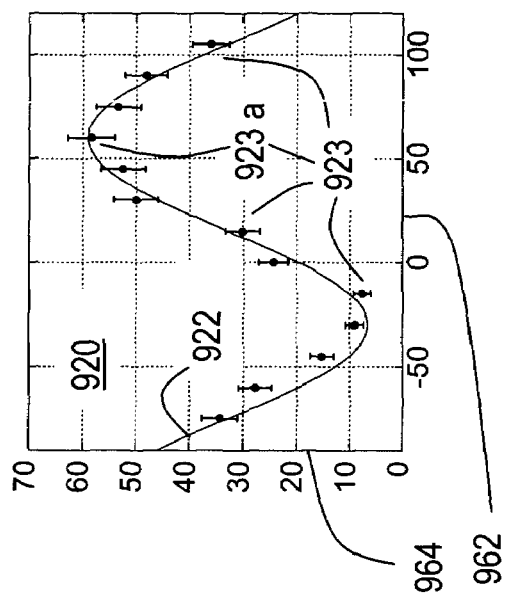
FIG. 9C
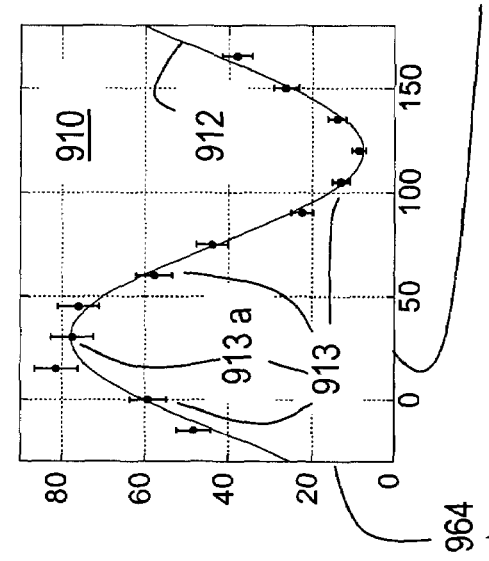
FIG. 9B
FIG. 9E
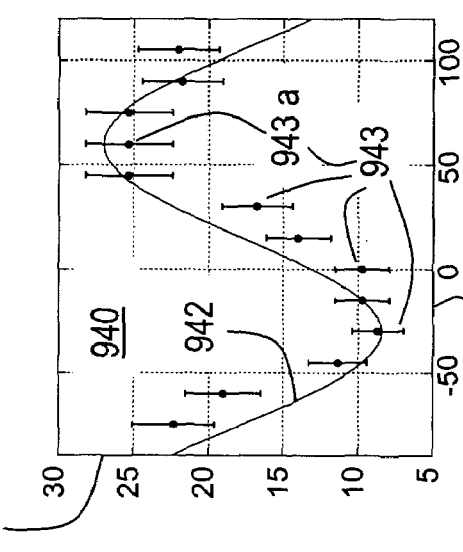
FIG. 9A
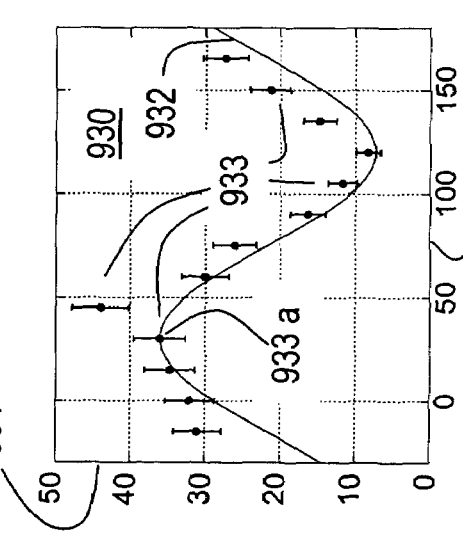
FIG. 9D

METHOD AND APPARATUS FOR SINGLE-PHOTON SOURCE AND QUANTUM MEMORY

CROSS-REFERENCE TO RELATED APPLICATIONS

This application claims benefit of Provisional Appln. 60/431,835, filed Dec. 9, 2002, the entire contents of which are hereby incorporated by reference as if fully set forth herein, under 35 U.S.C. §119(e).

This application claims benefit of Provisional Appln. 60/433,072, filed Dec. 13, 2002, the entire contents of which are hereby incorporated by reference as if fully set forth herein, under 35 U.S.C. §119(e).

This application is related to U.S. patent application, Ser. No. 10/286,735, by T. Pittman et al., filed Nov. 1, 2002 (hereinafter referenced as Pittman I), the entire contents of which are hereby incorporated by reference as if fully set forth herein.

STATEMENT OF GOVERNMENTAL INTEREST

This invention was made in part with Government support under Contract No. N0001-491-J1485 awarded by the Office of Naval Research. The Government has certain rights in the invention.

BACKGROUND OF THE INVENTION

1. Field of the Invention

The present invention relates to quantum information processing, and, in particular, to techniques for producing, storing, and retrieving quantum bits represented by single photons.

2. Description of the Related Art

The past approaches described in this section could be pursued, but are not necessarily approaches that have been previously conceived or pursued. Therefore, unless otherwise indicated herein, the approaches described in this section are not to be considered prior art to the claims in this application merely due to the presence of these approaches in this background section.

Information processing using classical computers relies on physical phenomena, such as magnetic fields, voltages, and optical intensity that can be produced and measured in each of two base states, one base state representing a zero and another base state representing a one. Each physical element that can achieve either of these two states represents one binary digit, called a bit. Quantum information processing uses physical elements that exhibit quantum properties that may include, not only one of the two or more base states, but also an arbitrary superposition state of the base states. A superposition state has some non-zero probability of being measured as one of the base states and some non-zero probability of being measured as another of the base states. A physical element that exhibits quantum properties for two base states represents one quantum bit, also called a qubit. Physical elements that are suitable for representing qubits include the spins of single electrons, electron states in atoms or molecules, nuclear spins in molecules and solids, magnetic flux, spatial propagation modes of single photons, and polarizations of single photons.

Logical operations performed on qubits apply not only to the base states of those qubits but also to the superposition states of those qubits, simultaneously. Quantum computers based on logical operations on systems of qubits offer the promise of massively simultaneous processing (also called massively parallel processing) that can address problems that are considered intractable with classical information processing. Such classically intractable problems that can be addressed with quantum computers include simulation of quantum interactions, combinatorial searches in unsorted data, finding prime factors of large integers, solving for cryptographic keys used in current secure communication algorithms, and truly secure communications (also called "quantum cryptography").

Obstacles to achieving quantum computers include the difficulty in isolating qubits from uncontrolled interactions with the environment, and transmitting qubits. Many of the physical elements that represent qubits, such as molecules and solids, are not readily transmitted, and interact strongly with their environment.

Single photons, however, interact little in many environments, including glass fiber and air, and are easily transmitted in such media. Therefore several approaches have utilized quantum properties of single photons.

One approach implements logical operations on single photons using non-linear interactions between single photons. A problem with non-linear interactions between single photons is that such interactions are very weak and no devices satisfactorily implement this approach.

Another approach uses linear interactions between single photons but relies on interferometer techniques, e.g., interference on two spatial modes of propagation for a single photon. For example, logic gates using this approach have been proposed by E. Knill, R. Laflamme, and G. J. Milburn, "A scheme for efficient quantum computation with linear optics," *Nature*, vol. 409, p. 49, 4 Jan. 2001 (hereinafter Knill) and by M. Koashi, T. Yamamoto, and N. Imoto, "Probabilistic manipulation of photons," *Physical Review* A, vol. 63, 030301, 12 Feb. 2001 (hereinafter Koashi). These devices are called "probabilistic" logical gates because they perform the desired logical operation in response to only a fraction of the input photons. However, it can be determined when an operation is performed successfully, so that, in a separate step often called a "post selection" step or a "post-detection selection" step, output photons are blocked unless the operation is successfully performed. It has been shown that the fraction can be increased close to a value of one with sufficient numbers of components and extra photons (called "ancilla") in particular states.

Probabilistic, linear devices proposed by Knill suffer from errors due to thermally induced phase shifts on the two spatial modes. Other probabilistic, linear devices proposed by Koashi reduce the phase shifts by including a large number of additional components and other resources, such as sources of a large number of qubits in particular states. Pittman I disclosed devices that perform logical operations on quantum states of single photons that operate on the polarization states of single photons and that do not suffer thermally induced phase shifts and that do not require a large number of additional components and resources. The Pittman I devices do employ some ancilla.

Many of these approaches for quantum computing benefit from a reliable source of single photons on demand in a particular state, with particular temporal and spectral properties, for example, to serve as a simple source for the ancilla described above, or to demonstrate the operation of the quantum logic operations. Furthermore, practical quantum computing is expected to utilize some mechanism for storing quantum bits with arbitrary values, for example to temporarily hold intermediate values during an extended computation.

Some approaches for providing single photons rely on a spontaneous emission of an isolated two-state quantum system, such as a single atom, ion, or quantum dot. However, these approaches for providing single photons suffer from at least two deficiencies: 1) uncertainty about whether a photon has been emitted; and 2) uncertainty about its direction. Although the probability of single-photon emission can be high in these approaches, there is no extant method for ensuring that a photon has actually been emitted. Furthermore, in some approaches, when a single photon is emitted, its direction may be any in a solid angle $4\pi$ encompassing all directions.

Based on the foregoing there is a clear need for a source of single photons in a specified state that provides a certain emission of a photon and with a known direction.

Existing approaches for storing qubits exploit the persistent nature of some phenomena that represent qubits. For example, in an ion-trap approach to quantum computing, the qubits are stored in potentially long-lived atomic states. However, these approaches are not directly applicable to qubits represented by the states of single photons, and no method currently exists for effectively converting and storing the arbitrary states of single photons in the long-lived atomic states and then retrieving and converting back to the original states of single photons.

Challenges in providing a memory for photonic qubits in arbitrary states include that: 1) the single photon qubit to be stored travels at the speed of light in the storage medium; 2) the single photon qubit must be stored so as to maintain its arbitrary quantum state (the coherence of the stored photon); 3) the single photon must be retrieved on demand; and 4) the single photon qubit must be stored and retrieved without measuring the state of the photon. This fourth challenge arises because a measurement results in one of the base states and destroys the superposition state of the photon, e.g., eliminates the probability that the photon will be measured in a different base state.

Based on the foregoing description, there is a clear need for techniques for a quantum memory to store and retrieve qubits represented by arbitrary polarization states of single photons.

SUMMARY OF THE INVENTION

Techniques are provided for storing a single photon for retrieving on demand, such as for uses related to quantum computing. An optical switch and optical storage loop are used as the basis of both a single-photon source and a quantum memory for photonic qubits. To operate as a single-photon source, the techniques include a source of a pair of photons, such as a parametric down-conversion crystal, which is known to emit photons in pairs. The detection of one member of the pair activates the switch, which re-routes the other member into the storage loop. The stored photon is then known to be circulating in the loop, and can be switched out of the loop at a later time chosen by the user, providing a single photon for potential use in a variety of quantum information processing applications. To operate as a quantum memory for photonic qubits, a single-photon in an arbitrary initial polarization state is coherently stored in the loop, and coherently switched out of the loop when needed.

According to one aspect of the invention, a method includes receiving a single photon through an optical input connected to an optical loop that includes a storage loop and an optical switch. A selectable state of the optical switch is set. Based on the selected state of the optical switch, a single photon incident on the optical switch is directed into the storage loop or into an optical output also connected to the optical loop.

In another aspect of the invention, the techniques include a device for storage and retrieval of a single photon. The device includes an optical input, an optical output, and an optical loop connected to the optical input and optical output. The optical loop includes a storage loop and an optical switch. Based on a selectable state of the optical switch, a single photon incident onto the optical switch is directed into the storage loop or the optical output.

In another aspect of the invention, the techniques include a method of fabricating a device for storage and retrieval of single photons, as described above.

According to another aspect of the invention, a method for generating a single photon includes receiving at a single-photon detector a first photon of a pair of photons from a source that generates pairs of photons. The detector generates a detector electric signal when a photon is incident on the detector. A first state of an optical switch is set based at least in part on the detector electric signal. The first state causes the optical switch to direct a photon received on an optical input spatial mode to a first output of two output spatial modes. A second photon of the pair is received on the optical input spatial mode. The second photon is directed from the optical switch through the first output into a storage loop. The storage loop returns the second electron to the optical switch after the second photon passes through the storage loop.

In an embodiment of this aspect, it is determined whether there is a demand for the second photon. If there is not such a demand, then a loop state of the switch is set to direct the second photon back into the storage loop through the first output when the second photon returns to the switch. In another embodiment, if there is a demand for the second photon, then a release state of the switch is set to direct the second photon to a second output, different from the first output, to serve as the single photon generated by the method.

In another aspect of the invention, the techniques include a source device for a single photon. The source includes an optical switch with an optical input and two optical outputs. A photon is directed to one of the two outputs based on an selectable state of the optical switch. The source also includes a storage loop for directing a photon from a loop mode of the two outputs to the optical input of the optical switch. A source for a pair of photons and a single-photon detector are also included. The detector outputs a detector electric signal when a photon is incident on the detector. An optical coupler directs a first photon of the pair of photons to the detector and a second photon of the pair to the optical input of the optical switch. An electronic processor is connected to the detector and the optical switch. The electronic processor sets a first state of the optical switch based at least in part on the detector electric signal from the detector.

In an embodiment of this aspect, the first state causes the optical switch to direct a photon incident at the optical input into the storage loop through the loop mode.

In another aspect of the invention, a linear optics device for uses related to quantum computing includes a linear optics quantum logic gate connected to a plurality of sources of single photons, as described above.

In another aspect of the invention, the techniques include a method of fabricating a source of single photons, as described above.

In another aspect of the invention, the techniques include a method for storing a single photon of arbitrary polarization state for uses related to a memory for quantum computing. The method includes receiving a single photon of arbitrary polarization state through an optical memory input. The single photon is directed into an optical loop in which the single photon propagates from a particular position back to the particular position. An selectable state is set for an optical switch disposed in the optical loop. Based on the selectable state of the optical switch, the single photon propagating in the optical loop is directed either back through the optical loop or through a memory output to serve as the retrieved quantum bit contents of the memory.

In another aspect of the invention, a storage device for use as a memory in quantum computing includes a memory input, a memory output, an optical loop and an optical switch. The memory input includes a first optical spatial mode for receiving a single photon of arbitrary polarization state. The memory output includes a second optical spatial mode for sending the quantum bit retrieved from the device. The optical loop is optically connected to the memory input and the memory output, and the single photon received at the memory input propagates from a particular position back to the particular position in the optical loop. The optical switch is placed in the optical loop and directs the single photon in the optical loop either back into the optical loop and or out through the memory output, based on an selectable state of the optical switch.

In one embodiment of this aspect, the single photon directed to the memory output has the same polarization state as the single photon received at the memory input. In another embodiment of this aspect, the single photon directed to the memory output has the values of its base states swapped compared to values of the base states in the photon received at the memory input.

BRIEF DESCRIPTION OF THE DRAWINGS

The present invention is illustrated by way of example, and not by way of limitation, in the figures of the accompanying drawings, in which like reference numerals refer to similar elements and in which:

FIG. 2B is a block diagram that illustrates a storage and retrieval device used as a certain source for a single photon in a particular polarization state, according to another embodiment;

FIG. 2C is a time line diagram that illustrates signals used to control an electro-optic switch in the source of FIG. 2B, according to an embodiment;

FIGS. 5A, 5B, 5C, 5D are graphs that illustrate experimental results from operating the experimental setup of FIG. 4, according to several embodiments;

FIGS. 8A, 8B, 8C, 8D, 8E are graphs that illustrate experimental results for retrieving a stored qubit by operating the experimental setup of FIG. 7, according to several embodiments;

FIGS. 9A, 9B, 9C, 9D, 9E are graphs that illustrate experimental results for coherent polarization states of a stored qubit by operating the experimental setup of FIG. 7, according to several embodiments; and

DETAILED DESCRIPTION

Methods and apparatuses for storing a polarization state of a single photon are described. In the following description, for the purposes of explanation, numerous specific details are set forth in order to provide a thorough understanding of the present invention. It will be apparent, however, to one skilled in the art that the present invention may be practiced without these specific details. In other instances, well-known structures and devices are shown in block diagram form in order to avoid unnecessarily obscuring the present invention.

For example, embodiments of the present invention are described in the context of providing one or more components for performing or demonstrating quantum computing, but the invention is not limited to that context. The invention may be applied in any context where single photons are desired in particular or arbitrary polarization states. As another example, embodiments are described herein using an electro-optical (EO) switch. In other embodiments other optical switches that cause a photon to take a selectable one of two or more spatial modes, known at the time when an embodiment is implemented, may be used, such as acousto-optical switches, mechanical switches, and optically activated optical switches.

1. Storage of a Single Photon for Retrieval on Quasi-Demand

Techniques are provided to store a single photon and to retrieve the photon at some later time, when, for example, a demand is made for the photon. These techniques provide a basis for a source of a single photon, which provides a single photon with near certain occurrence and with known spatial location and direction (e.g., known spatial mode). These techniques also provide a basis for a cyclical quantum memory for a qubit based on an arbitrary polarization state of a single photon. The techniques include an apparatus, a method of fabricating the apparatus, and a method of using the apparatus.

1.1 Structural Overview

Figure 1A:
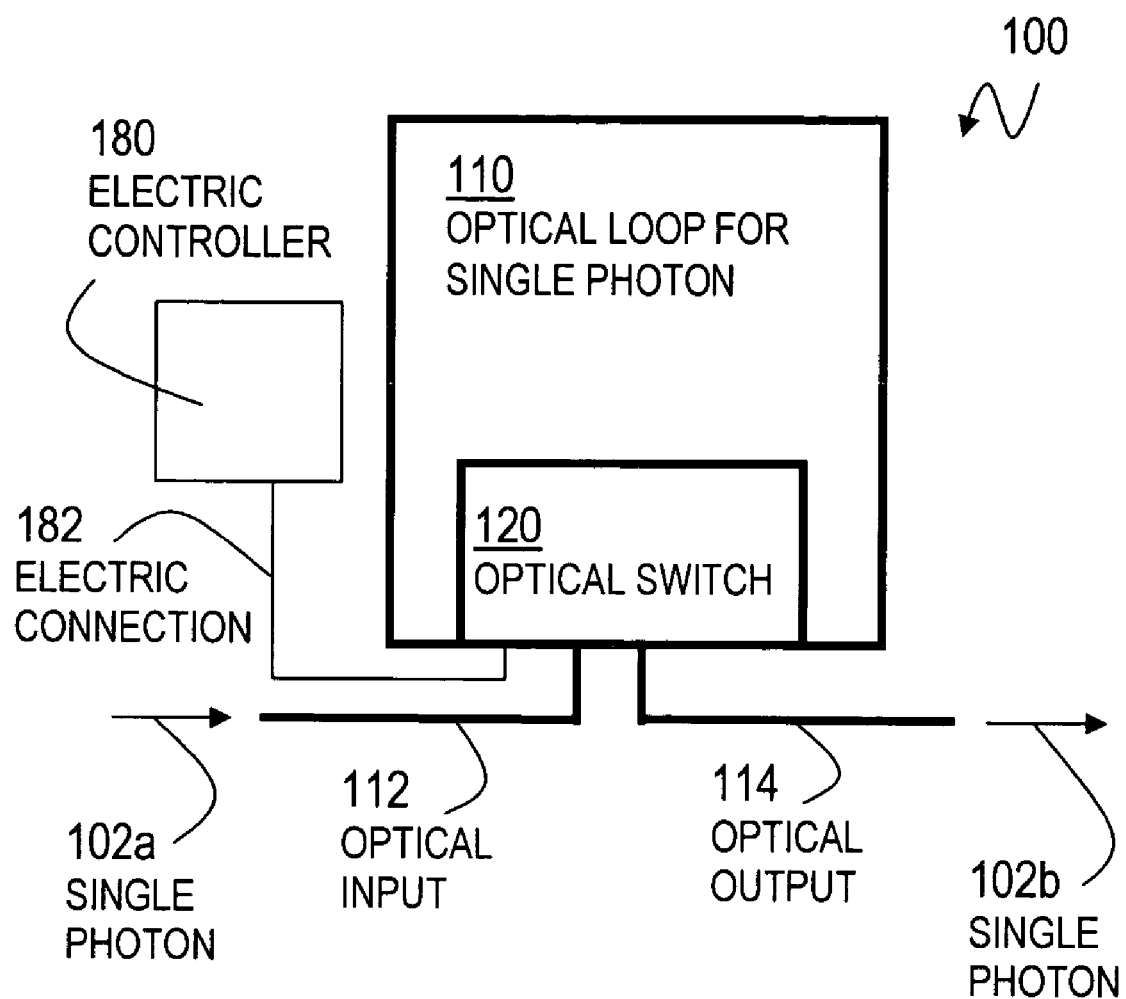
FIG. 1A is a block diagram that illustrates a storage and retrieval device for a single photon, according to an embodiment.

FIG. 1A is a block diagram that illustrates a storage and retrieval device for a single photon, according to an embodiment. The device includes an optical loop 110 that allows a single photon to propagate. The optical loop 110 includes an optical switch 120 and a storage loop (not shown). The storage loop returns back to the switch 120 a photon directed onto the storage loop from the switch 120. The optical loop 110 is optically connected to an optical input 112 and an optical output 114.

The optical switch 120 operates to direct a single photon into the storage loop of the optical loop 110 or into the optical output 114. In some embodiments, the optical switch 120 also operates to block photons other than a single photon desired to propagate in the optical loop 110. A photon incident on the switch 120 is blocked or directed into the storage loop or is directed to the optical output based on an selectable state of the switch 120.

In the illustrated embodiment, the selectable state of the switch 120 is determined by an electric controller 180. Any mechanism may be used to implement controller 180. For example, in some embodiments, controller 180 includes or is connected to a general purpose computer. In some embodiments, controller 180 includes one or more special circuits designed specifically for controlling switch 120 in device 100. Any method for passing classical information may be used to connect electric controller 180 to switch 120, including a wireless connection using electromagnetic waves. In the illustrated embodiment, an electric connection 182 connects the electric controller 180 to the switch 120.

1.2 Functional Overview

Figure 1B:
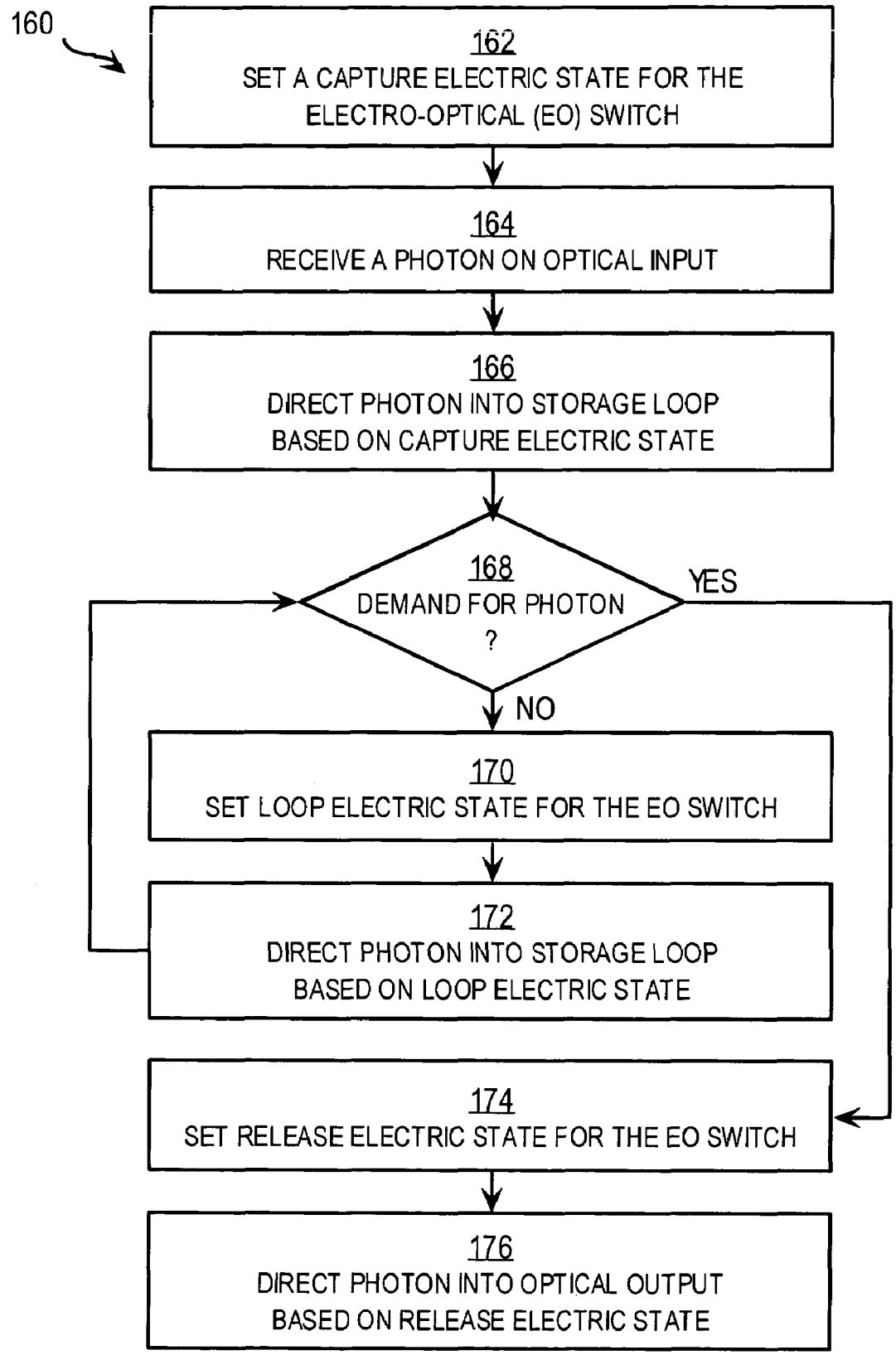
FIG. 1B is a flow diagram that illustrates at a high level a method for storing and retrieving a single photon, according to an embodiment.

FIG. 1B is a flow diagram that illustrates at a high level a method 160 for storing and retrieving a single photon, according to an embodiment.

In step 162, the electrical state of the EO switch 120 is set. In the illustrated embodiment, step 162 includes the operation of controller 180 to send a signal along connection 182 to switch 120. This electrical state determines whether a single photon incident on the switch from the optical input 112 is to be captured in the loop, and is called hereinafter the "capture state" of the EO switch. Three capture states are possible in the illustrated embodiment. In a first capture state, any photon incident on the switch 120 from the input 112 is blocked and is not transmitted through the switch. In a second capture state, a photon incident on the switch is directed to the storage loop of optical loop 110. In a third capture state, a photon incident on the switch is directed to the optical output 114. In some embodiments, more or fewer capture states are utilized; for example, the first and third capture states are the same in some embodiments, and they are different in other embodiments. In some embodiments, as described in more detail below, the controller 180 determines the capture state based on the detection of a trigger photon or photons with one or mores detectors (not shown in FIG. 1A). In some embodiments, the second capture state is set for only a short time window to ensure that only a single photon is directed into the storage loop.

In step 164, a photon is received on optical input 112. Any method may be used to direct a photon onto optical input 112. In some embodiments, step 164 is accomplished by use of an optical coupler to direct a photon from a photon source onto optical input 112. In some embodiments, step 164 is accomplished by use of an optical coupler to direct a photon from an output of an optical logic gate onto optical input 112.

In step 166, the photon is directed into the storage loop, or not, based on the capture electrical state. Step 166 includes directing the photon onto the switch. For example, in some embodiments, the optical input is connected to the switch 120 before the storage loop, and the photon is directed into the storage loop only if the second capture state had been set during step 162. In some embodiments, the optical input is directed into the storage loop before the switch 120, and the photon is blocked or directed into the optical output 114, unless the second capture state had been set during step 162, in which circumstance the photon is directed back onto the storage loop.

For purposes of illustration, it is assumed that the second capture state is set during step 162 and, therefore, that a single photon received at optical input 112 and subsequently incident on switch 120 is directed into the storage loop of optical loop 110.

In step 168 it is determined whether there is a demand for the photon propagating in optical loop 110. The demand can be determined in any manner known in the art at the time the device 100 is constructed. For example, the demand can be determined by a classical signal received on a classical input (not shown) to controller 180, such as an electric signal received on an electrical input. In some embodiments, the demand can be determined based on an output signal from a counter or timer operating in controller 180. In some embodiments, the demand can be determined based on measuring a photon or qubit in a detector (not shown) connected to controller 180.

If no demand for the photon is determined in step 168, then control passes to step 170. In step 170, the electrical state of the switch is set to return the photon to the storage loop before the time a photon propagating in the storage loop is returned to the switch 120. The electrical state of the switch 120 that causes the switch 120 to direct the photon from the storage loop back into the storage loop is called hereinafter the "loop state." In some embodiments, the loop state is the same as one or more of the capture states. In some embodiments, the loop state is different from any of the capture states. Control then passes to step 172.

In step 172, the switch 120 directs the photon incident on the switch 120 from the storage loop back onto to the storage loop, based on the loop state. Control then passes back to step 168 to determine if there is a demand for the photon.

If it is determined during step 168 that there is a demand for the photon propagating in optical loop 110, then control passes to step 174.

In step 174, the electrical state of the switch is set to direct the photon to the optical output 114 before the time a photon propagating in the storage loop is returned to the switch 120 The electrical state of the switch 120 that causes the switch 120 to direct the photon from the storage loop to the optical output is called hereinafter the "release state." In some embodiments, the release state is the same as one or more of the capture states. In some embodiments, the release state is different from any of the capture states. Control then passes to step 176.

In step 176, the switch 120 directs the photon incident on the switch 120 from the storage loop into the optical output 114, based on the release state. In some embodiments, step 176 completes the process of retrieving a single photon stored in optical loop 110. In some embodiments, control passes back to step 162 to set a capture state for the switch 120 in optical loop 110.

A characteristic of the storage and retrieval techniques described above is the production of a single photon on optical output 114 at a time after receipt of the photon on optical input 112 that is a multiple of a particular time interval. The particular time interval, called hereinafter a "loop interval," is the time for a photon to propagate through the optical loop 110. The loop time often does not present an obstacle to the use of the storage and retrieval techniques described herein. The loop time can be made very short (e.g., a loop time of about 13 nanoseconds is demonstrated below). A quantum computing cycle interval can be selected to match such loop times. In some embodiments the loop time is limited somewhat by the response time of optical switch 120. In some of these embodiments, the demand can be anticipated and the switch started ahead of the moment of demand so that a photon circulating with a loop time shorter than the response time can be switched out at a particular stage of the switch response.

In the following sections, more particular embodiments of switch 120 and storage loops are described for accomplishing types of functions useful in performing or demonstrating quantum computing, among other uses.

2. Certain Source of a Single Photon

As described in the background section, there is a need for obtaining a single photon on demand with near certainty and with a known spatial mode (location and direction of propagation). Such sources can provide ancilla photons for quantum logic gates or circuits, or can provide qubits for testing quantum logic gates or circuits, or both. A source of photons with near certainty in a known spatial mode is achieved at least according to the following embodiments.

2.1 Structural Overview

Figure 2A:
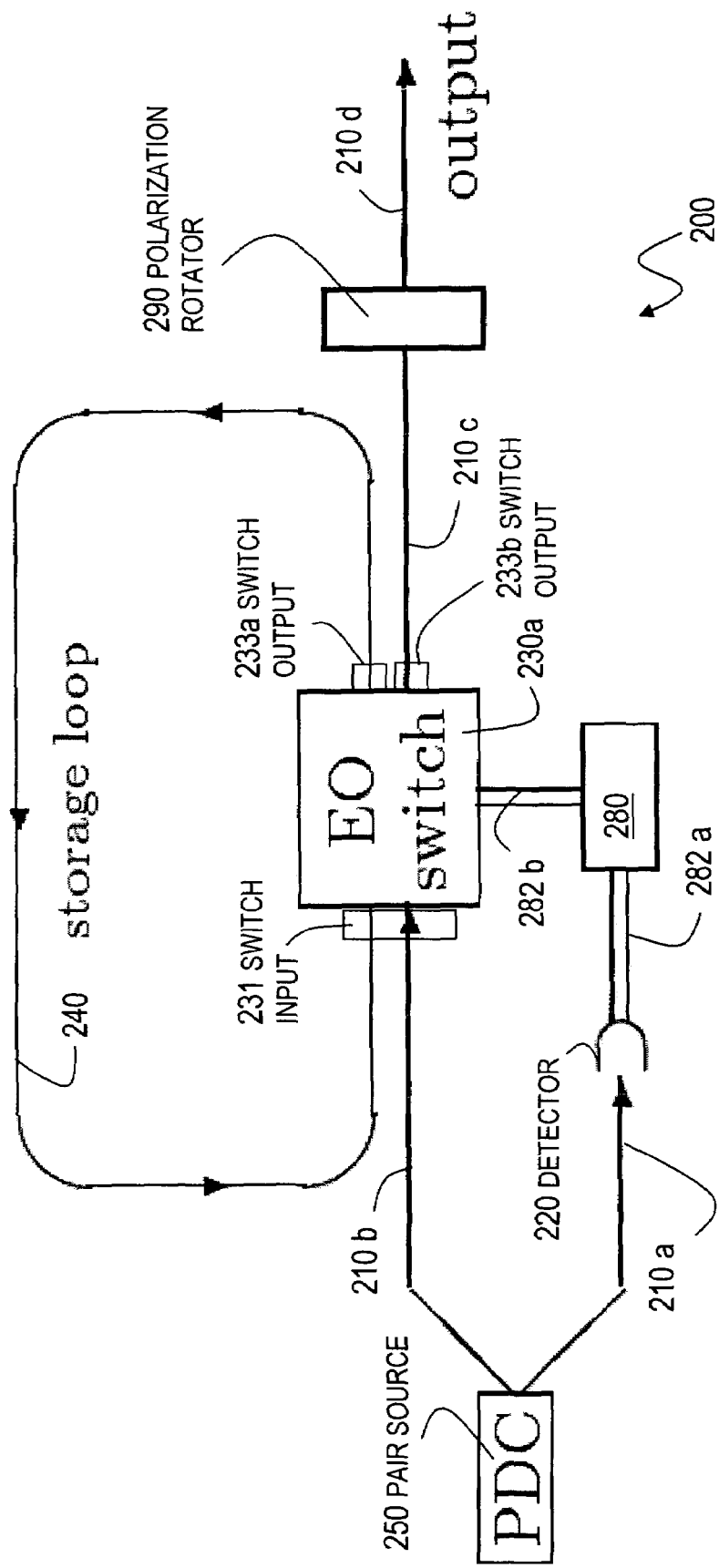
FIG. 2A is a block diagram that illustrates a storage and retrieval device used as a certain source for a single photon in a particular polarization state, according to an embodiment.

FIG. 2A is a block diagram that illustrates a storage and retrieval device used as a certain source 200 for a single photon in a particular polarization state, according to an embodiment.

The source 200 includes a source 250 that produces a photon pair with known polarization and spatial mode at an uncertain time. In an illustrated embodiment, the source 250 is a pulsed parametric down-conversion (PDC) source that produces one horizontally polarized photon, represented by state vector $\{1|H]+0|V]\}$, and one vertically polarized photon, represented by state vector $\{0|H]+1|V]\}$. As is well-known in the art, a PDC source is caused to emit a pair of photons in response to pumping of the PDC by a train of short pulses from a laser, such as a femtosecond mode-locked laser. The pair of photons is emitted at one of the well-defined times determined by the repetition rate of the pulsed laser. However, the specific pulse that actually produces the photon pair cannot be chosen in advance.

One photon of the pair is directed along optical path 210a, and the other is directed along optical path 210b. Any mechanism may be used to direct the photons onto optical paths 210a, 210b. In some embodiments, one or more optical couplers (not shown) are used. The photon on path 210a is directed to an electrical controller described below, and the photon on path 210b is directed to an optical loop, described below.

The optical loop includes EO switch 230a and storage loop 240. The optical loop is used to store a single photon until demanded.

Photons impinge on EO switch 230 through switch input 231 made up of one or more spatial modes. Photons that impinge on EO switch 230a are directed to switch output 233a or switch output 233b, or zero or more other switch outputs (not shown), collectively referenced hereinafter as switch output 233. The impinging photon is directed to one of the switch outputs 233 based on a selectable electrical state of the EO switch 230a. A photon directed to switch output 233a enters storage loop 240. A photon directed to switch output 233b follows optical path 210c to optical output 210d.

Storage loop 240 returns a photon from switch output 233a to switch input 231.

In the illustrated embodiment, a polarization rotator 290 is disposed in optical path 210c to generate an output photon with a particular polarization state, as described in more detail below.

The electrical controller includes a single-photon detector 220, connection 282a and processor 280. The detector 220 generates a classical signal when a single photon is incident on the detector 220. The processor 280 generates a signal to set the electrical state of the EO switch 230a. The electrical controller is connected to EO switch 230a by connection 282b. Connections 282a, 282b include any mechanism for passing classical information.

2.2 Functional Overview

According to the illustrated embodiment, once a pair of photons is emitted by source 250, one of the pair is detected by detector 220 of the controller and used to time the setting of the second capture state for the EO switch 230a. The EO switch 230a in the illustrated embodiment is a high-speed EO switch that routes the photon on path 210b into the storage loop 240 based on the second capture state imposed by the processor 280 of the controller. The stored photon is then known to be circulating in the optical loop and can be switched out on demand with a time precision on the order of the loop interval, or at an exact time corresponding to any number of round trips.

In the illustrated embodiment, the uncertain source 250 produces photons of known polarization states in known spatial modes, so the storage loop and switch can be designed to exploit that polarization state. For example, the EO switch 230a and storage loop 240 can be designed to capture and release the vertically polarized photon of each pair generated by the source 250. Depending on the use of the single photon, such as to simulate a qubit input to a quantum gate or to provide ancilla in particular states, a single photon in a different polarization state may be desired. The polarization rotator 290 is a device that generates the desired polarization state from the single photon stored in the optical loop, such as from a vertically polarized photon. Any mechanism may be used. The polarization rotator 290 my be a fixed device, such as a combination of a half wave plate and a quarter wave plate. or a dynamic device that rotates the photon based on a classical signal generated or received at the device such as a Pockels cell, well known in the art.

2.3 Detailed Embodiment

FIG. 2B is a block diagram that illustrates a storage and retrieval device used as a certain source for a single photon in a particular polarization state, according to an embodiment 201 of source 200. In FIG. 2B, the uncertain source 250 of a photon pair is omitted. The illustrated embodiment 201 excludes polarization rotator 290, but such a rotator is included in other embodiments.

Embodiment 201 includes an EO switch 230b, and includes delay component 222 and optical paths 210e, 210f in optical path 210b.

EO switch 230b includes a polarizing beam splitter (PBS) 232 that reflects vertically polarized photons and transmits horizontally polarized photons incident along any of several spatial modes. One input mode of PBS 232 serves as one switch input 231a of switch inputs 231.

EO switch 230b also includes a Pockels cell (PC) 234 that is used to rotate the polarization of the photon circulating in the optical loop. The Pockels cell 234 is configured so that it does not affect a photon incident on the Pockels cell 234 unless the Pockels cell 234 is turned "on" by a classical pulse from the processor 280 of the controller. When it is turned on, the Pockels cell 234 rotates the polarization of an incident photon by 90 degrees (π/2 radians) so that the single photon emerging from the Pockels cell 234 has a flipped polarization state. For example, a vertically polarized photon, incident on the Pockels cell 234 in an on state, emerges from the Pockels cell 234 as a horizontally polarized photon. When the Pockels cell 234 is turned "off," the incident photon's polarization is not changed. For example, a vertically polarized photon incident on the Pockels cell 234 in an off state emerges from a Pockels cell 234 as a vertically polarized photon. One input mode of PC 234 serves as another switch input 231b of switch inputs 231, which directs a photon emerging from PC 234 onto a second input mode 235 of PBS 232.

In the illustrated embodiment, a vertically polarized photon arriving on the optical input along path 210f enters switch input 231a into the PBS 232. The PBS automatically directs this vertically polarized photon into storage loop 240 through switch output 233a. Thus, in the illustrated embodiment, the photon circulates once in the storage loop before the electric state of the switch determines how it is directed.

The vertically polarized photon circulates in the storage loop 240 in the direction shown by the arrows on storage loop 240. The storage loop 240 directs a photon into the PC 234 through switch input 231b. If the PC 234 is in the off state, the photon emerges in the same vertically polarized state, enters PBS 232 at PBS input 235 and is reflected through switch output 233b and onto optical path 210c which leads to the source output. The photon is not captured. If the PC 234 is the on state, the photon emerges in the horizontally polarized state, enters PBS 232 at PBS input 235 and is transmitted through switch output 233a back onto the storage loop 240. The photon is captured. Therefore, in this embodiment, the second capture state corresponds to the PC on state; and the first and third capture states correspond to the PC off state.

The delay component 222 disposed in optical path 210b delays by a certain amount (called hereinafter the "fixed initial delay") the arrival of a photon from source 250 at the optical loop. Since the two photons of the pair are created at the same time, the processor can determine that the vertically polarized photon of the pair (called hereinafter "photon b") arrives at the optical loop after the detection in detector 220 of the horizontally polarized photon (called hereinafter "photon a") by a time related to the fixed initial delay.

In order to store the photon b in the optical loop for more than one circuit, i.e., to capture photon b, the processor 280 sends a short classical pulse p1 to the Pockels cell 234 so that the Pockels cell 234 is turned on during the first pass of photon b through the optical loop.

To store photon b in the optical loop for subsequent circuits, as is desired if the photon is not demanded, the Pockels cell is set to the off state, so that photon b remains horizontally polarized and continues to be transmitted through PBS 232 and directed into the storage loop 240. Therefore the loop state of the switch 230b that directs a captured photon back into the storage loop corresponds to the Pockels cell off state. Therefore the pulse p1 returns the Pockels cell state to the off state for the second and subsequent circuits through the storage loop.

When the stored photon is demanded, for example after a certain number of circuits, the Pockels cell state is changed back to "on" to again rotate the polarization of photon b by π/2. This changes the polarization of photon b from horizontal when it is incident on the Pockels cell 234 along input 231b back to vertical as it emerges from Pockels cell 234 along optical path 235. The vertically polarized photon b is reflected by PBS 232 into switch output 233b, thus releasing the captured photon on demand. Therefore the release state of the switch 230b that directs a captured photon to the optical output is the Pockels cell on state.

FIG. 2C is a time line diagram that illustrates signals used to control the EO seitch 230b in the certain source of FIG. 2B, according to an embodiment. Pulse 284a (p1) which transitions from off to on to off, arrives first at Pockels cell 234 so that the pulse 284a is on before photon b arrives at Pockels cell 234. Even a fast Pockels cell consumes some time to rise to the on state after receiving pulse 284a, so, in some embodiments, the leading edge of pulse 284a arrives at Pockels cell 234 before the photon b by at least the rise time of the Pockels cell 234. Similarly, the pulse 284a drops to the off state before the photon b makes a complete circuit of the optical loop back to the Pockels cell by a fall time of the Pockels cell 234. In some embodiments, the length of the storage loop, and consequently the loop interval (represented in FIG. 2C by $\tau_S$), is selected to be long compared to the Pockels cell rise time or fall time or both. The leading edge of pulse 284a determines that no photons are likely captured in the optical loop before the creation of the pair of photons of interest is detected.

After some number, n, of circuits through the optical loop, (represented in FIG. 2C by the time interval n $\tau_S$), a demand for the stored photon b is made by sending a pulse 284b (p2) to raise the electric state of the Pockels cell 234 to the on state. Again, the leading edge of pulse 284b should precede the arrival of photon b at the Pockels cell 234 by the rise time of the Pockels cell.

In some embodiments, the leading edge of p1 is extended before the arrival of photon b at the Pockels cell by more than the rise time of the Pockels cell. The amount of this extension is a design consideration to balance the chances of capturing an unwanted photon with the advantages of a loop interval as short compared to the Pockels cell rise time as possible. In some embodiments, the trailing edge of p2 is extended because the photon is already released and can't be released twice. Again the amount of the extension is a design choice to balance the chances of inadvertently capturing a stray photon after releasing photon b.

When it is known that a photon will be demanded at some later time, the uncertain source 250 is pumped early enough before the expected demand so that a photon pair is almost certainly produced some time before the demand. One of the produced photons is stored in the optical loop until the time of the demand.

Figure 3:
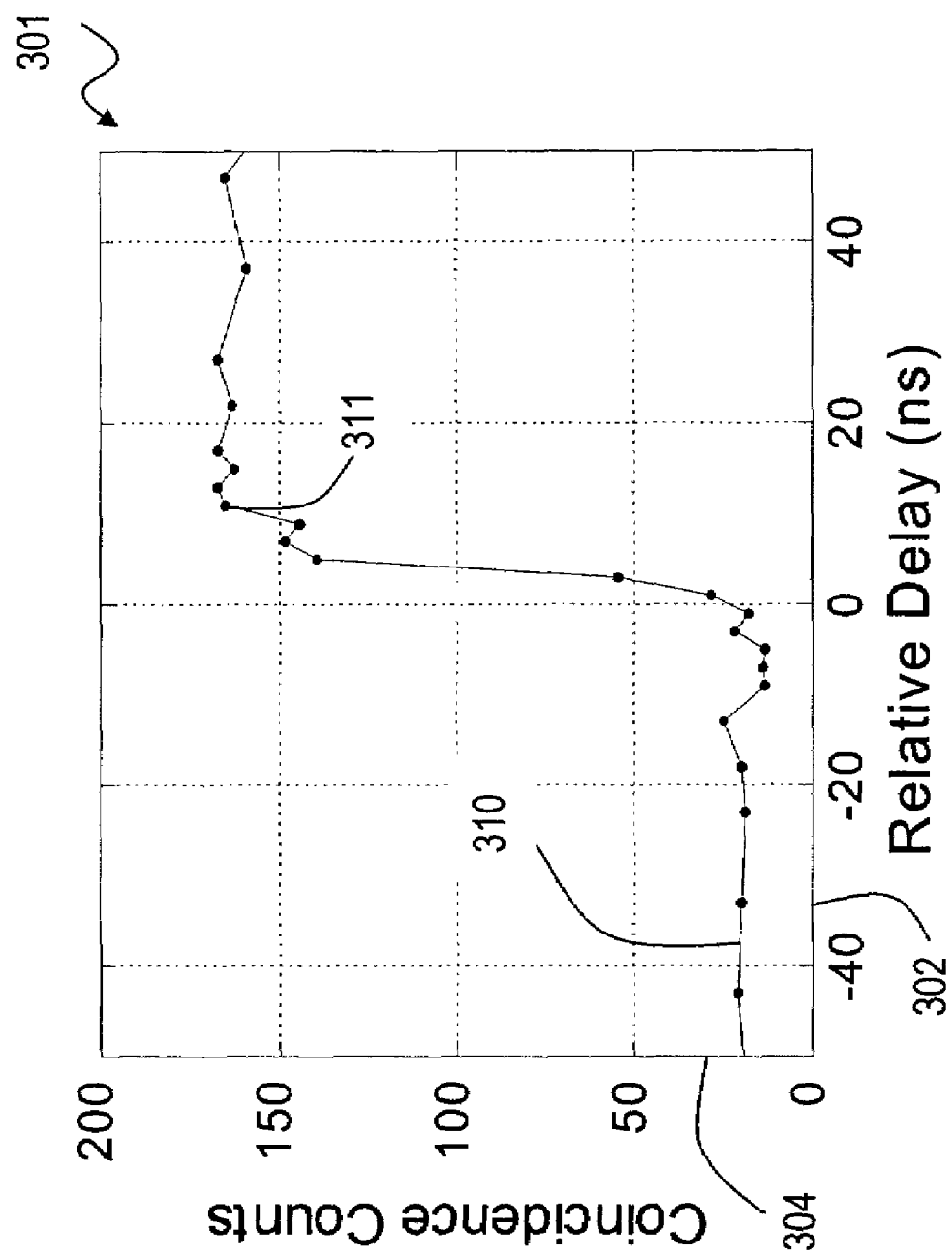
FIG. 3 is a graph that illustrates timing for operation of the electro-optic switch in FIG. 2B, according to an embodiment.

FIG. 3 is a graph that illustrates timing for operation of the EO switch 230b in FIG. 2B, according to an embodiment. In this embodiment, the loop interval $\tau_S$ is selected to be greater than the rise time of the Pockels cell 234.

Graph 301 includes an ordinate axis 302 that represents the relative delay after the application of an on electric pulse to a high-speed Pockels cell. The abscissa axis 304 represents the number of coincident counts over a 60 second time interval. Graph 301 shows a curve 310 of results for a ConOptics Inc. model 360-80/D25 Pockels cell representative of a high-speed Pockels cell. An experimental setup was used to give a coincident count whenever the Pockels cell reached an on state in time to change the polarization of photon b. Curve 310 shows a rise to a maximum number of correct counts at point 311 about 10 ns (nanoseconds, 1 ns=$10^{-9}$ seconds) after a pulse is applied, indicating that the Pockels cell consumed about 10 ns to completely reach the on state.

Based on the 10 ns rise time indicated in FIG. 3, it was determined that the storage loop should exceed 3 meters (m)

to allow the Pockels cell to reach the on state before a photon returned to impinge on the cell. In the experimental setup described in the following section, a 4 m storage loop was used with a corresponding $\tau_S$ of 13.3 ns.

To allow for the time required to detect photon a, generate pulse p1, and transmit pulse p1 to Pockels cell 234, a fixed initial delay of about 500 ns is introduced by delay component 222.

2.4 Example Setup

Figure 4:
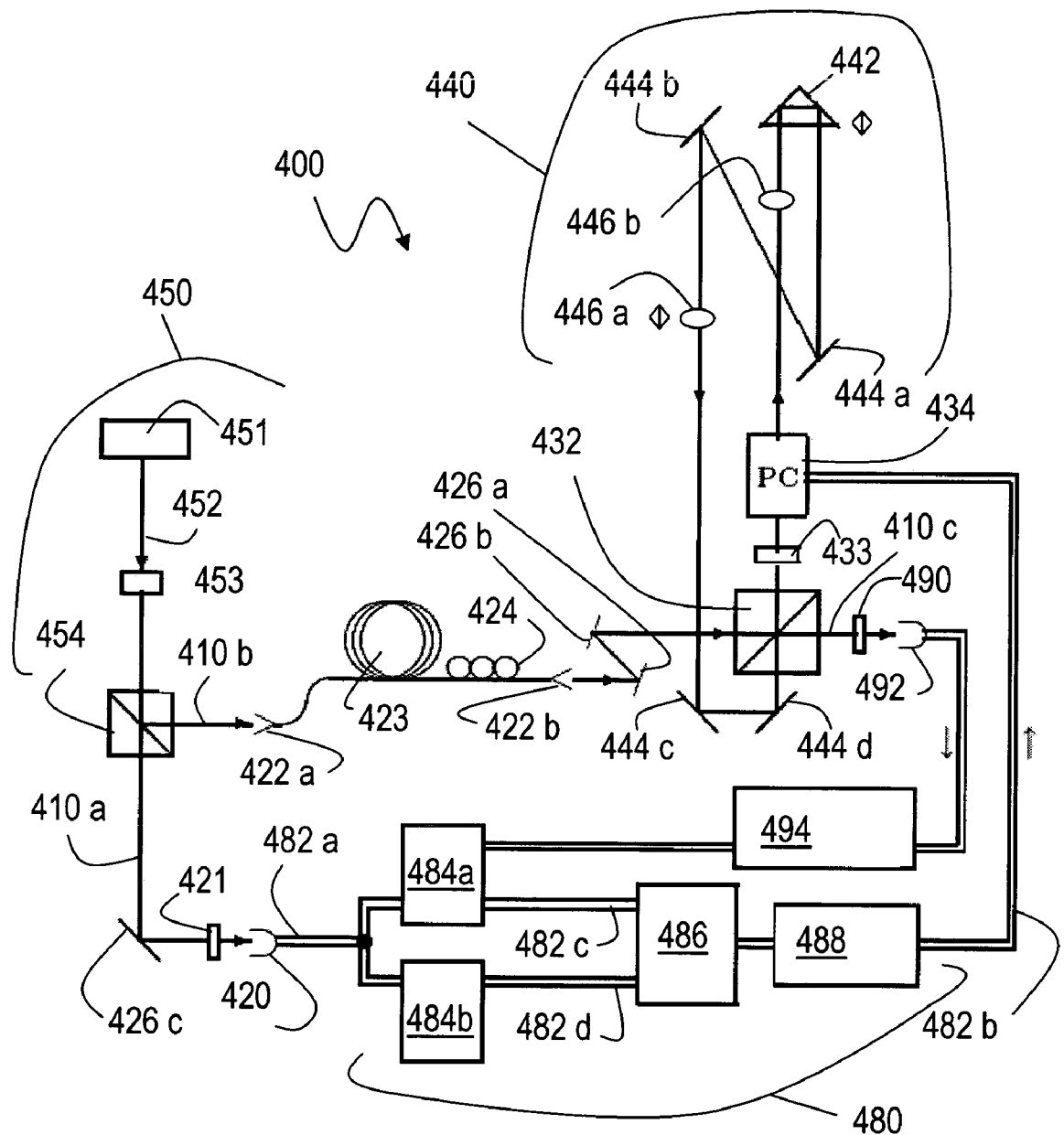
FIG. 4 is a block diagram that illustrates an experimental setup for testing performance of a certain source of a single photon, according to an embodiment.

FIG. 4 is a block diagram that illustrates an experimental setup 400 for testing performance of a certain source of a single photon, according to an embodiment. The setup 400 includes a certain source made up of a down-conversion source 450 of a pair of photons, two optical paths 410a, 410b, a electro-optic switch, a storage loop 440, an output optical path 410c, and a controller 480. The setup 400 also includes an output detector 492 and a coincident counter 494 for determining the operation of the certain source.

The down-conversion source 450 includes a laser 451 which generates a beam 452 to pump a crystal 453 which emits a pair of photons into polarizing beam splitter 454. In the example embodiment, the crystal 453 is a 1.0 millimeter (mm, 1 mm=$10^{-3}$ m) thick Beta-Barium-Borate (BBO) crystal. The BBO crystal 453 is pumped by roughly 30 milliwatts (mW, 1 mW=$10^{-3}$ Watts) of a laser beam 452 of photons with wavelengths of 351.1 nanometers (nm, 1 nm=$10^{-9}$ m) from a continuous-wave argon-ion laser 451. The BBO crystal 453 is cut for degenerative type-II collinear phase matching, as is well known in the art, to produce pairs of co-propagating but orthogonally polarized photons with wavelengths at 702.2 nm. The polarizing beam splitter 454 transmits the horizontally polarized photon of the pair, "photon a," (also called the "trigger photon") onto optical path 410a, and reflects the vertically polarized photon of the pair, "photon b," onto optical path 410b.

Optical path 410a directs photon a, the trigger photon, to detector 420 of the controller 480. In the example embodiment, optical path 410a includes a mirror 426c that reflects photon a through filter 421 into single-photon detector 420. The filter 421 limits the photons that are incident on detector 420 to those with wavelengths about 702 nm. In the example embodiment, a bandpass filter is used that is centered at 700 nm wavelength with a pass band that has a full width at half maximum of 10 nm.

The controller 480 includes the detector 420, two gate-and-delay (GD) generators 484a, 484b, a transistor logic OR gate 486, a driver 488 for a Pockels cell 434 in the electro-optic switch, and electrical connections 482a, 482b, 482c. Electrical connections including connections 482a, 482b, 482c, are collectively referenced hereinafter as connections 482.

Any suitable devices known in the art at the time a setup is implemented may be used. In the example setup embodiment, the single photon detector 420 is a PERKIN ELMER model SPCM-AQR-12 single-photon counting avalanche photodiode that generates a transistor-transistor logic (TTL) pulse, pD, along connection 482a, when a single-photon is detected. Two independent CANBERRA model 410A electronic gate-and-delay (GD) generators are used. The GD generators 484a, 484b generate pulses p1 and p2, respectively, based on receiving the pulse pD from the detector 420 along connection 482a. Pulse p1 is used to time the second capture state of the Pockels cell 434, and pulse p2 is used to time a release state to simulate a demand for the captured photon, as shown in FIG. 2B. These GD generators are configured to generate pulses with a minimum duration of about 100 ns, which is sufficient to test the operation of the source, even with a loop interval of 13 ns, as is described in more detail below. The OR gate 486 is used so that either pulse p1 or p2 may be used as input to driver 488 of the Pockels cell 434. The driver 488 converts the pulses as necessary to generate on and off states in the Pockels cell 434, such as by amplification, or by changing a bias voltage on the Pockels cell based on pulses p1 and p2.

The optical path 410b, for photon b, includes fiber couplers 422a, 422b, fiber delay line 423, fiber polarization controller 424, and mirrors 426a, 426b. These elements serve to direct photon b into an optical input of the source with a sufficient delay to account for the time of operation of controller 480 and Pockels cell 434. In the example embodiment, the avalanche photo-detector consumes 18 ns to produce the leading edge of pulse pD, the GD generators 484a, 484b were each configured with a dead time of 200 ns so that the production of the trailing edge of pulse p1 consumed 300 ns. The OR gate 486 imposed 18 ns of delay, and the amplifiers in driver 488 imposed about 38 ns of delay. Various coaxial cables used as electrical connections 482 imparted an additional 60 ns of delay. Therefore photon b is delayed about 434 ns or more in optical path 410b.

Any suitable devices known in the art at the time a setup is implemented may be used in optical path 410b to delay the arrival of photon b. In the example embodiment, the fiber couples 422a, 422b optically couple a photon into and out of the optical fiber delay line 423. The fiber couples 422a, 422b are made of suitable microscope objective lenses mounted on micro-translational stages, and the fiber optic delay line 423 is made up of a 3M brand FS-3224 single mode fiber long enough to provide over 500 ns of delay. A standard fiber polarization controller 424 is used to negate the effects of birefringence induced by the fiber. Mirrors 426a, 426b steer photon b, still vertically polarized, into polarizing beam splitter (PBS) 432 of the electro-optic switch.

The switch includes PBS 432 and Pockels cell 434. The PBS 432 reflects a vertically polarized photon b into the Pockels cell 434. In this setup, the Pockels cell is arranged with its fast and slow axes rotated 45 degrees from vertical polarization. The Pockels 434 cell is in the off state, so as not to rotate an incident photon, when it is biased with a direct current voltage to cause no rotation of an incident photon. The Pockels cell 434 is in an on state, to rotate polarization of an incident photon by 90 degrees, when a measured half wave voltage is applied. The measured half wave voltage is roughly 115 volts (V) at wavelengths of 702.2 nm for the switching times used in the example setup. An additional half-wave plate 433 is included for diagnostic tests described in a later section. When the switch is operated normally, the half-wave plate 433 is oriented so that it does not rotate the polarization of an incident photon.

The storage loop 440 includes a 4 meter long optical path in free space. Disposed in the storage loop 440 are a right angle prism 422, mirrors 444a, 444b, 444c, 444d, and lenses 446a, 446b. In order to minimize divergence of photons following this path, and maximize a total number of round trips a single photon can reliably propagate through the storage loop, the two lenses 446a, 446b are included, each with one meter focal length. Lens 446a and prism 442 are mounted on longitudinal translation stages to form a Gaussian transmission line that can be optimized by the relative positions of the lens 446a and prism 442. The degree of collimation produced by fiber coupler 422b is adjusted to mode-match a beam into the storage loop to reduce the chances of losing a single photon passing through the fiber delay line 423. This matching is accomplished in a setup calibration phase, during which bright light at 694 nm from a laser diode is coupled into the fiber delay line 423.

To properly time the on and off states of the Pockels cell 434 with 100 ns pulse lengths in pulses p1 and p1, in the example setup 400, the leading edges of pulses p1 and p2 are adjusted. The leading edge of pulse p1 is timed so that the Pockels cell transition from on to off, 100 ns later at the trailing edge of p1, occurs immediately after the first pass of photon b through the Pockels cell. The leading edge of pulse p2 is timed so that the Pockels cell transition from off bark to on, based on the leading edge of pulse p2, occurs just before the arrival of photon b during its final pass through the Pockels cell. The 100 ns extent of pulse p2, which would rotate any following photons, is irrelevant because the only photon in the optical loop has already been released. The timing of p1 was set to a fixed value relative to detection at detector 420, and the timing of pulse p2 was set to several different values after detection at detector 420, to demonstrate the ability to release the captured photon on demand after a chosen number of round trips through the optical loop.

The output detector 492 and coincident counter 494 are used for determining the operation of the certain source. A second filter 490 limits detection at detector 492 to photons with the proper wavelength. In the example embodiment, the detector 492 is a second single-photon avalanche photodiode, and the filter 490 is a second bandpass filter centered at 700 nm with a pass band of 10 nm. When the stored photon is output on demand, it impinges on detector 492, which generates a second detector pulse pD2. Another pulse from GD generator 484a is sent to the coincident counter 494 to determine the time of the output photon relative to the detection of photon a, the trigger photon.

2.5 Example Results

The experimental setup 400 was first operated with the Pockels cell in the off state so that it did not rotate the polarization of an incident photon to capture, loop or release the photon. This was done to determine the rate of loss of photons in the optical loop including the storage loop and switch.

The half-wave plate 433 was oriented to rotate an incident photon by 45 degrees. This generates a photon in a superposition state in which there is a 50% chance the rotated photon will be measured as horizontally polarized and 50% chance it will be measured as vertically polarized. Therefore when the rotated photon impinges on the PBS 432 there is a 50% chance it will be transmitted back into the storage loop as horizontally polarized (and therefore "measured" as horizontally polarized). Similarly, there is a 50% chance it will be reflected to output path 410c as vertically polarized and detected in detector 492 and therefore "measured" as vertically polarized.

If the experiment is repeated sequentially hundreds of times with hundreds of single photons, and the optical loop is perfectly efficient, it is expected that 50 percent of the photons will be reflected out after the first pass, 50% of the remainder out after the second pass, and so on. The number of photons detected at detector 492 after each 13 ns pass though the optical loop should fall by a factor of two. This is described by a curve of the form $(1/2)^n$, where n is the number of passes through the loop (given by time after detection and delay divided by the loop time, e.g. 13 ns). If the optical loop is not perfectly efficient, as is expected, the number of photons detected at detector 492 will fall off faster than $(1/2)^n$.

This experiment was repeated with about 5000 single photons over a 30 minute period. As expected, the number of photons detected after each round trip decreased by more than a factor of two. The data fit a curve of the form $(1/2.7)^n$ indicating a loss of about 26% per round trip. The majority of this loss is due to optical losses in the various components used to form the storage loop.

FIGS. 5A, 5B, 5C, 5D are graphs that illustrate experimental results from operating the experimental setup of FIG. 4, according to several embodiments, with different times for the arrival of pulse p2. In these experiments, the half-wave plate 433 is oriented to have no effect on the polarization of the photon b in the optical loop. In each of FIGS. 5A, 5B, 5C, 5D, the abscissa axis 502 is time after detection of photon a, at detector 420, corrected for delay in path 410b, in ns; and the ordinate axis 504 is number of detections at detector 492. The counts are accumulated for hundreds of single photons over a two minute period. In each of these figures, pulse p1 is generated by GD generator 484a if a photon is detected in detector 420. Pulse p1 is timed to capture photon b by setting the Pockels cell 434 in the on state about 95 ns before photon b first arrives at the Pockels cell 434, and dropping the Pockels cell 434 to the off state before photon b returns to the Pockels cell 434, after one pass through the storage loop 440.

FIG. 5A is a graph 510 of results obtained when the pulse p2, generated by GD generator 484b, is timed, after the detection of a trigger photon in detector 420, to release a photon in the optical loop after two circuits through the storage loop. P2 is thus timed to raise the Pockels cell 434 to the on state less than 26.6 ns after the photon b first arrives at the Pockels cell 434 and more than 13.3 ns after. This simulates a demand for the photon captured in the optical loop at a particular time in the time interval 13.3 ns to 26.6 ns after photon b is captured. For a perfect system, photon b is released, detected at detector 492 and counted at counter 494 at 26.6 ns for every photon pair generated by the down conversion source 450. The trace 512 on graph 510 depicts the actual results of the experimental setup 400 with such pulses p2 . The trace shows a dominant peak 513 at 26.6 ns, as desired, indicating that the system works.

FIGS. 5B, 5C, 5D are graphs 520, 530, 540 of results obtained when the pulse p2 is timed to release a photon after three, four and five passes, respectively, through the storage loop. In results similar to those of FIG. 5A, traces 522, 532, 542 of actual results for experimental setup 400 on graphs 520, 530, 540 show dominant peaks 523, 533, 543, respectively, as desired at times 39.9 ns, 53.2 ns, and 66.5 ns, respectively. The integrated areas under the peaks at the desired times decreases with the number of passes through the optical loop in a manner that is roughly consistent with the 26% loss per pass.

However, the system is not perfect. Traces 512, 522, 532, 542 indicate some counts throughout the recording interval from about 8 ns to about 70 ns, with small peaks corresponding to the time of each complete pass through the optical loop. The small peaks indicate that a photon is sometimes released from the optical loop before pulse p2 is received, and that a photon is sometimes not released on the pass when the pulse p2 is received but at some later pass. It is believed that the small peaks are due to switching errors caused by photons diverging in the storage loop and not passing through the Pockels cell within a proper range of angles. Outside the proper range of angles, the Pockels cell does not apply the correct half-wave voltage to an entire wave front associated with a propagating photon.

In the results obtained with setup 400, the effects of false triggering events and photon losses where greater than the effects of 26% loss per pass through the loop and the switching errors. False triggering events occur when the detector 420 generates an output signal even though a photon has not impinged on the detector—a so-called "dark count." As a consequence of dark counts, many fewer photons are stored in the optical loop than indicated by detector 420. Photon loss errors occur when a real photon a is detected at detector 420 but photon b is lost before entering the storage loop 440.

In practice, neither of these errors represents a major drawback for the single photon source. The effects of dark counts can be reduced to a low level by the use of femtosecond pulsed down-conversion as the source of the photon pair. Such sources allow gating of the detector 420 so that output from the detector is ignored except during the small fraction of the time after each pulse that an output pair is possible. For the photon loss problem, recent down-conversion experiments have shown that a near unity ratio of detection rates can be achieved (e.g., P. G. Kwait, A. M. Steinberg, R. Y. Chian, P. H. Eberhard, and M. D. Petroff, Appl. Opt. 33, 1844, 1994). In addition, new techniques for efficiently coupling down-conversion radiation into optical fibers have been demonstrated (e.g., C. Kurtsiefer, M. Oberparleiter, and H. Weinfurter, Phys. Rev. A 64, 023802, 2001).

The probability of two down-conversion pairs being emitted within the switching time is negligible, because, in general, the source of the photon pair is pumped in the conventional regime where the time between emissions is long compared to the switching time (on the order of 10 ns).

Problems associated with low quantum efficiency of the detector 420 are expected to be irrelevant, since an undetected trigger photon, photon a, will not cause a photon b to be captured, and the apparatus can be run long enough until a trigger photon is actually detected. To prevent un-triggered photons from entering the storage loop, the pulse pl can be made shorter. In addition, an additional switch, or switch electronic state, or switch component, could be used to prevent un-triggered photons from entering the storage loop.

3. Cyclical Quantum Memory

As described in the background section, there is a need for a memory for qubits represented by arbitrary polarization states of single photons. In a quantum memory embodiment, a single-photon in an arbitrary initial polarization state is coherently stored in the loop, and coherently switched out of the loop when needed. A memory for such qubits is achieved at least according to the following embodiments.

3.1 Structural Overview

Figure 6A:
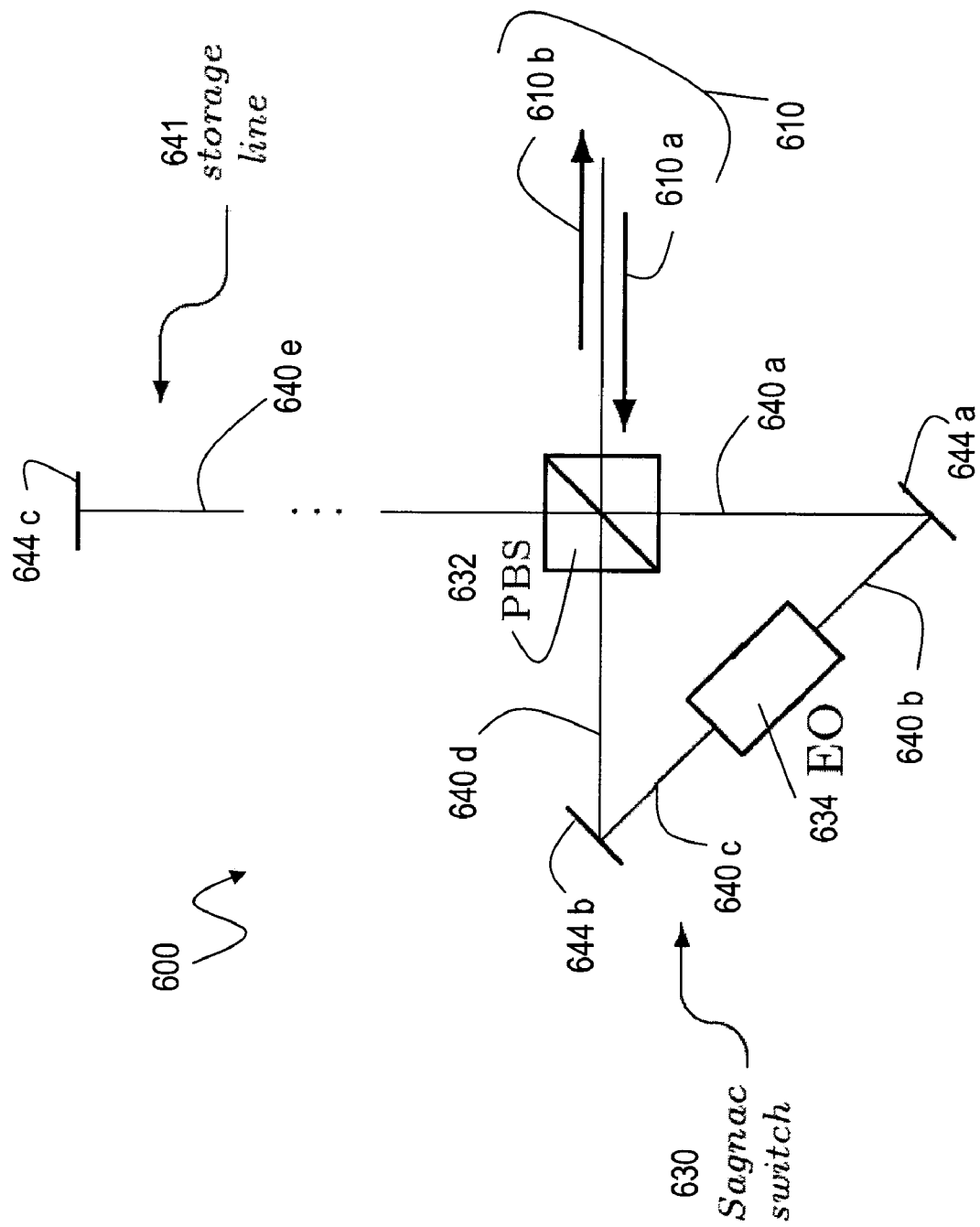
FIG. 6A is a block diagram that illustrates a storage and retrieval device used as a cyclical quantum memory (CQM) for a qubit represented by an arbitrary polarization state of a single photon, according to an embodiment.

FIG. 6A is a block diagram that illustrates a storage and retrieval device used as a cyclical quantum memory (CQM) for a qubit represented by an arbitrary polarization state of a single photon, according to an embodiment 600. The CQM 600 involves an optical loop that includes a Sagnac interferometer switch 630 and a storage line 641.

The Sagnac interferometer switch 630 is formed with mirrors 644a, 644b, a polarizing beam splitter (PBS) 632, and an electro-optic (EO) device 634. The EO device is configured to do nothing in an off electrical state, and to swap vertical and horizontal polarization of an incident photon in an on electrical state. That is, when the EO device 634 is in an on electrical state, an incident photon with an arbitrary polarization state given by polarization state vector $\alpha|H]+\beta|V]$ is emitted with a swapped ("bit-flipped") polarization state given by polarization state vector $\beta|H]+\alpha|V]$. This rotation of horizontal polarization into vertical and vertical polarization into horizontal can be represented by the notation $|H] \leftarrow \rightarrow |V]$. In an illustrated embodiment, EO device 634 includes a Pockels cell configured to perform the rotation of horizontal polarization into vertical and vertical polarization into horizontal.

The storage line 641 is formed by an upper face of the PBS 632, optical path 640e and mirror 644c. The upper face of PBS 632 includes two spatial modes in opposite directions, coupled to optical path 640e, one entering the PBS 632 along 640e and the other exiting the PBS 632 along 640e.

The optical input and optical output of the CQM are formed by a right face of PBS 632 with two spatial modes in opposite directions coupled to optical path 610. Spatial mode 610a directed toward PBS 632 along optical path 610 is included in the optical input to the CQM. Spatial mode 610b directed away from PBS 632 along optical path 610 is included in the optical output from the CQM.

A photon with initial polarization state $|\psi]_{in}$ is directed along spatial mode 610a as input to the CQM. A photon with final polarization state $|\psi]_{out}$ is directed along spatial mode 610b as output from the CQM. For a useful CQM it is desired that $|\psi]_{out}$ be coherently related to $|\psi]_{in}$ so that there is no loss of coherence in the CQM. In the illustrated embodiment, $|\psi]_{out}$ in a known one of two states corresponding to the initial polarization state and the swapped (bit-flipped) polarization state.

Figure 6B:
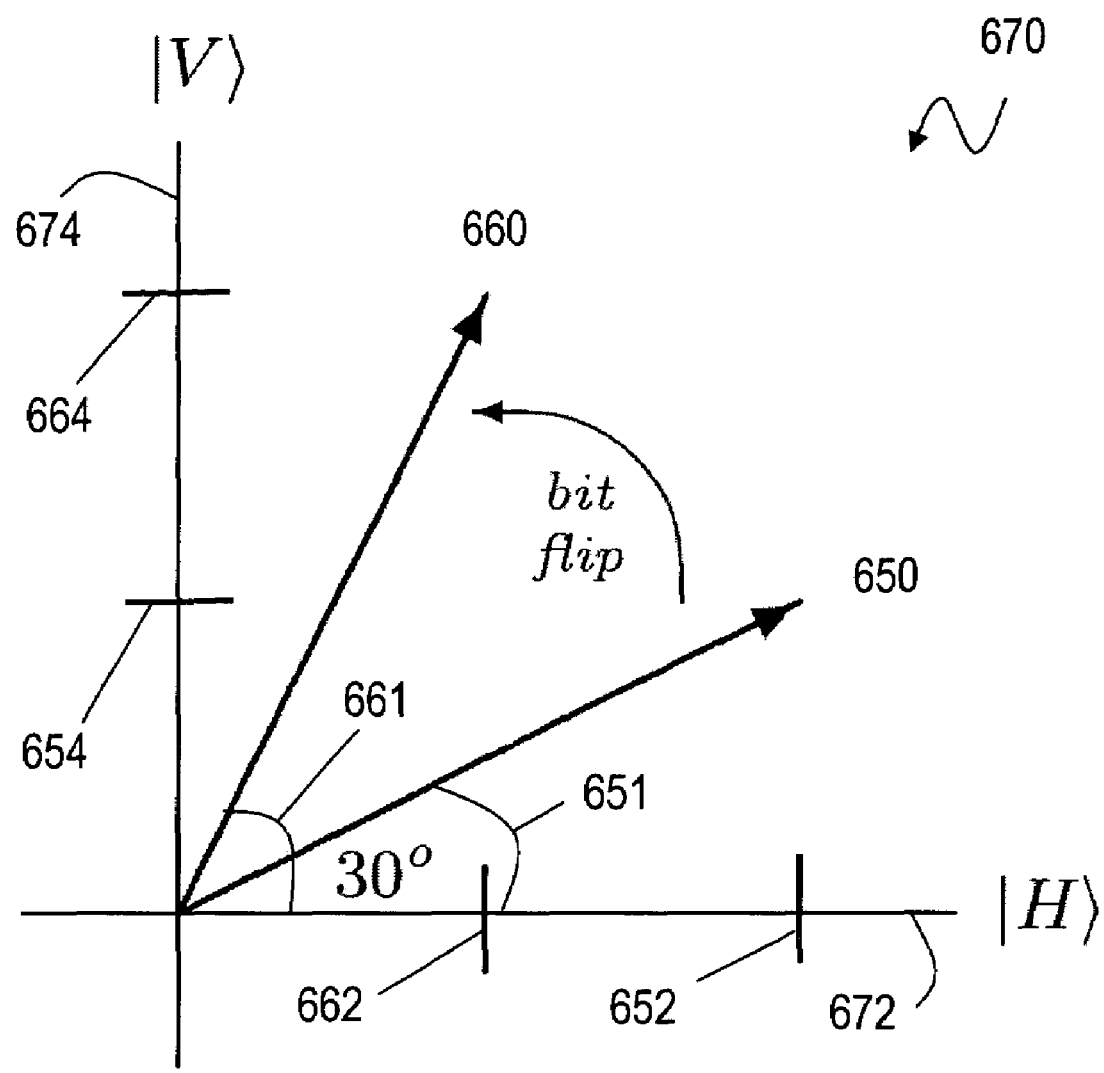
FIG. 6B is a graph that illustrates two coherent polarization states for a single photon stored in the CQM of FIG. 6A, according to an embodiment.

FIG. 6B is a graph that illustrates two polarization states for a single photon stored in the CQM of FIG. 6A, according to an embodiment. The abscissa axis 672 represents the value (square root of the probability) of the horizontal component $|H]$ of a superposition polarization state; and the ordinate axis 674 represents the value of the vertical component $|V]$ of a superposition polarization state. Vector 650 represents the superposition polarization state of a photon polarized at 30 degrees; it has a horizontal component represented by the distance from the origin to tick mark 652 and a vertical component represented by the distance to tick mark 654. The state vector corresponding to vector 650 is $$|\psi]_{650} = \tfrac{1}{2}\sqrt{3}|H] + \tfrac{1}{2}|V] \tag{1a}$$

A photon in this superposition state has a 75% chance of being measured as horizontally polarized and has a 25% chance of being measured as vertically polarized.

After being bit-flipped by EO device 634, the photon is in a state given by vector 660. The horizontal component of vector 660, indicated by the distance to tick mark 662 is equal to the vertical component of vector 650, indicated by tick mark 654. The vertical component of vector 660, indicated by the distance to tick mark 664 is equal to the horizontal component of vector 650, indicated by tick mark 652. Vector 660 is polarized at 60 degrees and has a state vector $$|\psi]_{660} = \tfrac{1}{2}|H] + \tfrac{1}{2}\sqrt{3}|V] \tag{1b}$$

A photon in this superposition state has a 25% chance of being measured as horizontally polarized and has a 75% chance of being measured as vertically polarized. Its qubit value is flipped relative to the qubit value of a photon polarized as vector 650.

3.2 Functional Overview

A photon with an arbitrary initial polarization, representing a qubit to be stored in CQM 600, enters the CQM 600 along optical input 610a. After some time, the qubit is demanded from the CQM, and a photon with a polarization coherently related to the initial polarization is emitted along optical output 610*b*.

The operation of the device 600 can be understood by first considering the case in which the EO device is not turned on. In this case, the vertical component of the incident qubit is reflected to path 640*a* and travels clockwise through the Sagnac switch to mirror 644*a*, path 640*b*, EO device 634, path 640*c*, mirror 644*b*, path 640*d* and back into PBS 632, still vertically polarized. In PBS 632, the vertical component is reflected into the storage loop 641 onto mirror 644*b*. After reflection, the photon retraces its path in reverse order, is reflected by PBS to propagate counterclockwise in the Sagnac switch and returned to PBS 632. Still vertically polarized, the vertical component is reflected to optical output 610*b*. The vertical component represents those photons that would be measured as vertical.

The horizontal component is first transmitted through PBS to travel counterclockwise through Sagnac switch 630, up into storage loop 641 to mirror 644*c*. After reflection, the photon retraces its path in reverse order, is transmitted by PBS to propagate clockwise in the Sagnac switch and returned to PBS 632. Still horizontally polarized, the horizontal component is transmitted to optical output 610*b*. The horizontal component represents those photons that would be measured as horizontal.

Thus, whether the initial photon incident on optical input 610*a* would be measured as horizontally or vertically polarized, it passes through the optical loop and is output along optical output 610*b*. The output does not depend on the state of the photon, therefore the probabilities being measured in either state have not changed and the superposition is preserved.

If there were no losses and no polarization-dependent phase shift, the output photon would emerge in the same superposition state as the initial photon, i.e., $|\psi]_{out}=|\psi]_{in}$. In any device there is some phase shifts due to birefringence and some propagation losses. Usually, thermally or vibrationally induced phase shifts are even greater than phase-shifts due to birefringence. For example, in a Mach-Zehnder interferometer, thermal and vibrational phase shifts can easily ruin the coherence of the horizontal and vertical superposition states of a propagating photon.

In the CQM, the horizontal and vertical components follow the same path, but in opposite directions. Therefore the thermal and vibrational phase shifts are essentially the same for both components and any phase shifts apply equally to both components, thus preserving the coherence of the propagating photon.

In order for the CQM to store the qubit for more than one round trip (or pass) through the optical loop, the Pockels cell serving as the EO device 634 is turned on while the photon is propagating in the storage line for the first time. Thus, in the illustrated embodiment, the capture electric state for the Sagnac switch 630 is an on state properly timed while the photon is in the storage loop 642. Upon subsequent passes through the Sagnac switch 630, the photon's polarization is repeatedly flipped if the EO device 634 remains in the on electrical state. After each flip, each component of the photon polarization is returned by the PBS 632 to the storage loop 641 instead of exiting the device along the optical output 610*b*. The photon remains trapped in the optical loop as long as the Pockel's cell is in the on electrical state. Thus the loop state is an on electrical state in the illustrated embodiment. When the Pockel's cell is turned to the off electrical state, the final values of the counter-propagating horizontal and vertical components are those required to release the photon from the device. Thus the release state is an off electrical state in the illustrated embodiment.

The loop and release states can be demonstrated for the initial vertical component. After reflection from the mirror 644*c* and PBS 632, the vertical component reflects off mirror 644*b* and transits the Pockels cell serving as the EO device 634. The photon is emitted as horizontally polarized, and thus becomes a horizontal component of the photon. After reflection at mirror 644*a*, it is transmitted by PBS 632 back onto the storage loop 641. The horizontal component is reflected at mirror 644*c*, transmitted through PBS 632, reflected from mirror 644*a* and passed through Pockels cell as EO device 634. If the Pockels cell is still on, the photon emerges as vertically polarized along path 640*c*, is reflected at mirror 644*b* and PBS 632 back into the storage loop. It returns to PBS 632, is reflected to mirror 644*b* and then to the Pockels cell serving as EO device 634. If the Pockels cell is still on, the photon emerges as a horizontal component and repeats the cycle just described. If the Pockels cell is off, the photon emerges still vertically polarized and, after reflection at mirror 644*a* is reflected by PBS 632 to the optical output 610*b*. The same reasoning applies to the initial horizontal component, at any moment propagating through the Sagnac switch in the opposite direction to the initial vertical component.

A characteristic of the embodiment 600 is that if the Pockels cell is turned off when the initial vertical component is propagating as a horizontal component (and therefore the initial horizontal component is propagating as a vertical component), the photon emitted along optical output 610*b* is bit flipped with respect to the initial input photon. This occurs after the photon has made an even number of trips through the storage loop and is represented by the superposition state symbol $|\psi]_{even}$. After an odd number of trips through the storage loop, the photon emitted along optical output 610*b* is the same as the initial input photon and is represented by the superposition state symbol $|\psi]_{odd}$. This can be expressed by the relationships in Equation 2:

$$|\psi]_{in}=\alpha|H]+\beta|V] \tag{2a}$$

$$|\psi]_{odd}=|\psi]_{in}=\alpha|H]+\beta|V] \tag{2b}$$

$$|\psi]_{even}=\sigma_X|\psi]_{in}=\beta|H]+\alpha|V] \tag{2c}$$

where the symbol $\sigma_X$ represents a bit-flip operation.

The bit-flipping characteristic of the CQM embodiment 600 can be accommodated a number of ways in different embodiments that utilize this CQM. In one embodiment, the CQM round trip time ("loop interval") is selected to be half a cycle time of a quantum computer using the CQM so that a qubit is always retrieved after an odd number of trips through the storage loop. In another approach, a feed-forward control can be used to re-flip photons representing qubits retrieved after an even number of trips through the storage loop. In some embodiments, the bit-flipped qubit returned from the CQM after an even number of passes is used in subsequent logic gates that allow for the bit-flipped value.

By repeatedly flipping polarization states for looping photons, certain types of errors automatically correct themselves. For example, unwanted polarization-dependent phase shifts imparted in the storage line affect each of the two initial components an equal number of times for qubits retrieved after an even number of trips through the storage loop. As a result, the accumulated phase shift over an even number n of multiple passes factors out of the final state.

Similarly, the net relative phase shift for qubits retrieved after an odd number n of trips through the storage loop is only that due to the final trip, and not the accumulation of phase shifts due to the previous n-1 trips. The phase shift between components does not practically increase beyond the phase shift induced by one trip through the storage loop. Therefore, the phase shift between components does not increase with the number of passes through the storage loop or the optical loop.

The CQM device 600 involves timing the transition of the EO device 634 from an off electrical state to on electrical state after a photon has propagated once through the EO device 634 and before the photon returns from the storage loop 641. Thus an electric controller for controlling the electrical state of the EO device 634 should determine when a qubit for storage is incident on the device, e.g., at PBS 632. This can be done in any way known in the art, when the CQM is implemented. In some embodiments, the controller determines when a qubit is produced according to a particular quantum computing circuit by counting cycles of the quantum computer. In many embodiments of quantum logic devices, a qubit is produced probabilistically at a time that cannot be predicted. However, in many of these devices, the generation of a correct qubit is determined by detecting one or more ancillary photons and generating classical information based on such detections to allow the correct qubit to propagate to the next device. Therefore, in some embodiments, the classical information used to determine the production of a correct qubit is also used to time the change of state of the EO device 634 to store the qubit.

3.3 Example Setup

Figure 7:
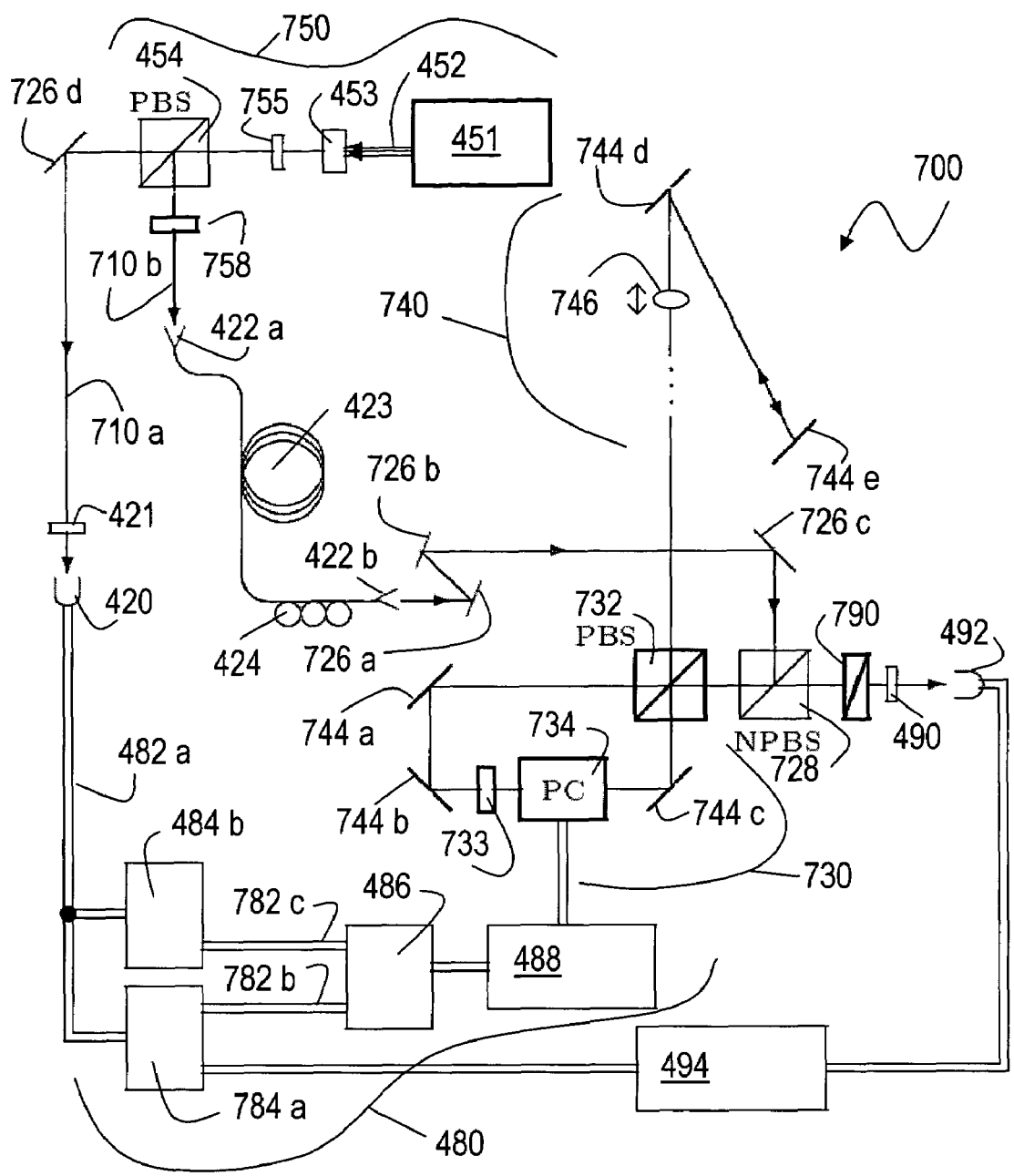
FIG. 7 is a block diagram that illustrates an experimental setup for testing performance of a CQM, according to another embodiment

FIG. 7 is a block diagram that illustrates an experimental setup 700 for testing performance of a CQM, according to another embodiment. The setup 700 includes a QCM, a down-conversion source 750 of a pair of photons, two optical paths 710a, 710b, and a polarization analyzer 790, for determining the operation of the CQM. To complete the analysis of the CQM operation, the setup also includes a controller 480, a filter 490, an output detector 492, and a coincident counter 494, as described above in FIG. 4, for determining the operation of the certain source.

The CQM includes a Sagnac switch 730 and a storage loop 740. The Sagnac switch 730 includes PBS 732, Pockels cell 734, and mirrors 744a, 744b, 744c. In this setup, the Pockels cell 734 is configured in differently from that described above for Pockels cell 434 in setup 400. Here, the Pockels 734 cell is biased with a direct current voltage so that in the off electrical state it does rotate an incident photon, and flip its polarization states. When the Pockels cell 734 is in an on electrical state by virtue of an a received pulse, it does not flip polarization states of an incident photon. An additional half-wave plate 733 is included for diagnostic tests described below. When the switch is operated normally, the half-wave plate 733 is oriented so that it does not rotate the polarization of an incident photon.

The storage loop 740 includes a 3.5 meter long optical path in free space. When combined with a 0.5 meter path length in the Sagnac switch 730, one pass through the optical loop takes about 13.3 ns. This is done so that the loop time is longer than the state change time of the Pockels cell 734 (about 10 ns to change from off to on electrical states, as described above). Disposed in the storage loop 740 are mirrors 744d, 744e, and lens 746. In order to minimize divergence of photons following this path, and maximize a total number of round trips a single photon can reliably propagate through the storage loop 740, the lens 746, with one meter focal length, is mounted on a longitudinal translation stage and longitudinally adjusted to form a standard 2f Gaussian transmission line.

The down conversion source 750 is similar to the down conversion source 450 of FIG. 4, including laser 451, optical path 452, BBO crystal 453, and PBS 454. Source 750 includes an ultra-violet filter 755 to decrease spurious photons emitted from the ultra-violet pump-laser, which might contaminate the CQM results.

The horizontal photon of the pair of photons from the down-conversion source 750, photon a, is directed along optical path 710a. Photon a is used as a trigger photon to time the transition of the electrical state of the Pockels cell 734 in the Sagnac switch 730. The vertical photon of the pair, photon b, is directed along optical path 710b to form the qubit stored in the QCM. Half-wave plate 758 is included in path 710b to rotate the vertically polarized photon to a different superposition state. In all the experiments described in the following, half-wave plate 758 is rotated so that photon b is polarized 30 degrees above horizontal, as shown for vector 650 in FIG. 6B, to represent a qubit in the superposition state described by Equation 1a.

Controller 480 sets the electrical state of Pockels cell 734 to store and then retrieve a qubit in the CQM. Controller 480 includes detector 420 and filter 421, as well as GD generators 484a, 484b, OR gate 486, and Pockels cell driver 488, as described above for setup 400. The transition between the on electrical state and the off electrical state of the Pockels cell 734 is driven by two different pulses p1, p2, from GD generators 484a, 484b. This allows the use of TTL pulses with widths of about 100 ns that far exceed the loop time of about 13 ns, as described above for setup 400. The electrical components of the controller 480 are connected by electrical connections, such as electrical connections 782a, 782b, 782c, to achieve the described operation of controller 480. Pulse p1 is generated by GD generator 484a if a photon is detected in detector 420. Pulse p1 is timed so that it changes the Pockels cell electrical state from off to on at a first particular time. Pulse p2 is generated by GD generator 484b if a photon is detected in detector 420. Pulse p2 is timed so its leading edge arrives after the trailing edge of pulse p1 to change the Pockels cell electrical state from off (flip polarization) to on (don't flip polarization) at a second particular time. The Pockels cell change is based on an interpretation by Pockels cell driver 488 of the arrival of pulses p1 and p2 from the TTL OR gate 486.

To allow for the time consumed by the controller 480 to generate the electrical states for the Pockels cell 734, optical path 710b includes fiber optic delay 423, fiber couples 422a, 422b, and fiber polarization controller 424 as described above. The fiber delay 423 includes 120 meters of fiber. Optical path 710b also includes steering mirrors 726a, 726b, 726c and non-polarizing beam splitter (NPBS) 728. The fiber polarization controller 424 corrects for the birefringence in the fiber as well as pre-compensating for small birefringent phase-shifts of the mirrors 726a, 726b, 726c and the NPBS 728. The NPBS is a 50-50 beam splitter that transmits 50% of incident photons and reflects 50%, without regard to the polarization of the photon. NPBS 728 couples qubits into the CQM optical input mode directed toward the right face of PBS 732. With the NPBS 728, the ratio of photons received over optical path 710b to photons that are both input into the CQM and output from the CQM into detector 492 is expected to be 0.25.

The CQM outputs a qubit on the optical output, which is a spatial mode directed away from the right face of PBS 732.

The polarization state of the output qubit is determined using the polarization analyzer 790, along with the filter 490, output detector 492 and coincident counter 494 described above. The polarization analyzer 790 is rotated to preferentially pass photons in a given polarization, as described in more detail below.

3.4 Example Results

FIGS. 8A, 8B, 8C, 8D, 8E are graphs that illustrate experimental results for retrieving a stored qubit by operating the experimental setup of FIG. 7, according to several embodiments, with different times for pulses p1 that stores a qubit and p2 that demands retrieval of the stored qubit. To generate the data graphed in FIGS. 8A, 8B, 8C, 8D, 8E, the polarization analyzer 790 is omitted from the experimental setup 700 shown in FIG. 7. The analyzer 790 was omitted in order to more clearly demonstrate the switching performance of the CQM and to assess losses in the CQM.

In each of FIGS. 8A, 8B, 8C, 8D, 8E the abscissa axis 862 is time in ns after detection of photon a at detector 420, corrected for delay in path 710b, passage through the Sagnac switch 730, and arrival at detector 492. The ordinate axis 864 is number of detections at detector 492. The counts are accumulated for thousands of qubits stored and retrieved in CQM over a ten minute period.

FIG. 8A depicts graph 800 for coincident counts when pulses p1 and p2 are timed to prevent the qubit from passing into the storage loop 740, i.e., for zero passes through the storage loop 740. This is accomplished if pulse p1 causes the Pockels cell 734 to be in the on state (don't flip polarization) when photon b reaches the Pockels cell the first time. This simulates a demand not to store a qubit. For a perfect system, photon b is released, detected at detector 492 and counted at counter 494 at 0 ns for every photon pair generated by the down conversion source 750. The trace 802 on graph 800 depicts the actual results of the experimental setup 700 with such pulses p1. The trace shows a dominant peak 803 at 0 ns, as desired.

FIGS. 8B, 8C, 8D, 8E are graphs 810, 820, 830, 840 of results obtained when the pulses p1 and p2 are timed to store and release a qubit after one, two, three and four passes, respectively, through the storage loop 740. In results similar to those of FIG. 8A, traces 812, 822, 832, 842 of actual results for experimental setup 700 on graphs 810, 820, 830, 840 show dominant peaks 813, 823, 833, 843, respectively, as desired at times 13.3 ns, 26.6 ns, 39.9 ns, and 53.2 ns, respectively. These traces indicate that the CQM can store and retrieve a qubit at desired times.

The integrated areas under the peaks at the desired times decrease with the number of passes through the optical loop in a manner that is roughly consistent with 19% loss per pass. This loss per pass is associated with the optics of the optical loop, including the storage loop 740 and switch 730, as determined in experiments similar to experiments described above for setup 400. In these experiments, the Pockels cell is left "off" to flip polarizations on each pass and the half-wave plate 733 is oriented to rotate a photon's polarization by 45 degrees. Of this 19% loss per pass, it is estimated that 15% is due to reflection and transmission losses of the various optical components, and 4% is due to imperfect focusing in the 2F Gaussian transmission line. Small peaks at other times are due to switching errors, as described above for setup 400.

The capacity of the CQM to maintain qubit coherence is determined by testing the polarization state of the qubit emitted along the optical output. For these tests, the polarization analyzer 790 is included in the experimental setup and rotated to pass qubits in a particular polarization state. FIGS. 9A, 9B, 9C, 9D, 9E are graphs 900, 910, 920, 930, 940 that illustrate experimental results for coherent polarization states of a stored qubit by operating the experimental setup of FIG. 7, according to several embodiments with different times for pulse p1 and p2. For each graph the polarization analyzer 790 is set at several orientations; and at each orientation ten minutes of coincident counts are obtained.

In each of FIGS. 9A, 9B, 9C, 9D, 9E the abscissa axis 962 is orientation of polarization analyzer 790 in degrees relative to horizontal polarization. The ordinate axis 964 is number of detections at detector 492. The counts at each orientation are accumulated for thousands of qubits stored and retrieved in CQM over a ten minute period. The number of passes through the storage loop 740 increases from zero to four in FIG. 9A through FIG. 9E, successively. In each of FIGS. 9A, 9B, 9C, 9D, 9E only counts in the dominant peaks 803, 813, 823, 833, 843, respectively, are included.

FIG. 9A depicts graph 900 for coincident counts when pulses p1 and p2 are timed to prevent the qubit from passing into the storage loop 740, i.e., for zero passes through the storage loop 740. Zero is an even number expected to produce an output qubit in the coherent bit-flipped state $|\psi\rangle_{even}$ given by Equation 2c, i.e., a polarization at 60 degrees. For reference a cosine-squared curve 902 centered at the expected angle 60 degrees is plotted on graph 900. The data points 903 on graph 900 depict the actual results of the experimental setup 700 as a function of the orientation of the polarization analyzer. The points 903 show general agreement with curve 902. A point 903a corresponding to a 60-degree orientation for the polarization analyzer has a count close to the maximum of all points 903, as desired.

FIGS. 9C, 9E are graphs 920, 940 of results obtained after two and four passes, respectively, through the storage loop 740. These are also expected to produce an output qubit in the coherent bit-flipped state $|\psi\rangle_{even}$ for even numbers of passes, given by Equation 2c, i.e., a polarization at 60 degrees. For reference, cosine-squared curves 922, 942 centered at the expected angle, 60 degrees, are plotted on graphs 920, 940, respectively. In results similar to those of FIG. 9A, points 923, 943 of actual results for experimental setup 700 on graphs 920, 940, respectively, show general agreement with cosine-squared curves 922, 942, respectively, with near maximum values for counts at points 923a, 943a, respectively, corresponding to 60 degrees, as desired.

FIGS. 9B, 9D are graphs 910, 930 of results obtained after one and three passes, respectively, through the storage loop 740. These are expected to produce an output qubit in the initial state $|\psi\rangle_{in}$ for odd numbers of passes, given by Equation 2b, i.e., a polarization at 30 degrees. For reference, cosine-squared curves 912, 932 centered at the expected angle, 30 degrees, are plotted on graphs 910, 930, respectively. In results similar to those described above, points 913, 933 of actual results for experimental setup 700 on graphs 910, 930, respectively, show general agreement with cosine-squared curves 912, 932, respectively, with near maximum values for counts at points 913a, 933a, respectively, corresponding to 30 degrees, as desired.

These graphs 900, 910, 920, 930, 940 indicate that the CQM in experimental setup 700 can maintain the coherence of a qubit for different storage times corresponding to different numbers of passes through storage loop 740.

These results are not perfect. With an increase in the number of passes through the storage loop, as shown successively in FIG. 9A through FIG. 9E, the maximum counting rate and the agreement with the cosine-squared curve decrease, somewhat, as would be expected in a setup that has not been optimized for performance. It is believed that the decreased agreement with the cosine-squared curves is due to small misalignments of the mirrors 744c, 744d, which produce spatial offsets that accumulate with each pass through the storage loop 840. These spatial offsets can reduce the spatial overlap of the horizontal and vertical components on the optical output, thereby reducing the interference conditions utilized to maintain the coherence of the qubit. Such errors are expected to be substantially reduced in different embodiments, which use fiber optic components rather than free-space components in the CQM.

The illustrated embodiments of the CQM demonstrate that qubits represented by polarization states of single photons can be stored in a simple free-space optical loop. Optical approaches to quantum computing are likely to involve the use of trains of intense laser pulses, such as those generated from mode-locked Ti-sapphire lasers, to generate input qubits for optical quantum logic gates. Such trains of pulses provide a natural clock cycle for a quantum computer. A CQM as illustrated here is ideally suited for storage of qubits generated by these gates for one or more such clock cycles.

In the foregoing specification, the invention has been described with reference to specific embodiments thereof. It will, however, be evident that various modifications and changes may be made thereto without departing from the broader spirit and scope of the invention. The specification and drawings are, accordingly, to be regarded in an illustrative rather than a restrictive sense.

What is claimed is:

1. A source for a single photon for uses related to quantum computing, comprising:
   an optical switch with an optical input spatial mode and two optical output spatial modes, wherein a photon is directed to one of the two output spatial modes based on a selectable state of the optical switch;
   a storage loop for directing a photon from a loop mode of the two output spatial modes of the optical switch to the input spatial mode of the optical switch;
   a source for a pair of photons;
   a single-photon detector that outputs a detector electric signal when a photon is incident on the single-photon detector;
   an optical coupler that directs a first photon of the pair of photons to the single-photon detector and a second photon of the pair of photons to the input spatial mode of the optical switch; and
   an electronic processor connected to the single photon detector and the optical switch,
   wherein the electronic processor is configured for setting a first state of the optical switch based at least in part on the detector electric signal that is output from the single-photon detector.

2. The source as recited in claim 1, wherein:
   the electronic processor is further connected to an electronic input; and
   the electronic processor is further configured for setting a second state of the optical switch based at least in part on an input signal received on the electronic input.

3. The source as recited in claim 1, wherein the first state causes the optical switch to direct a photon incident in the input spatial mode into the loop mode.

4. The source as recited in claim 2, wherein the second state causes the optical switch to direct a photon incident in the input spatial mode into a source output mode of the two output spatial modes, wherein the source output mode is different from the loop mode.

5. The source as recited in claim 4, further comprising a polarization rotator optically coupled to the source output mode to rotate a polarization of a photon propagating along the source output mode to produce a single photon with a particular polarization state.

6. The source as recited in claim 1, said optical coupler further comprising a delay path to delay an arrival time of the second photon at the optical switch until after the processor has set the first state of the optical switch based on the detector electric signal that is output by the single-photon detector when the first photon is incident on the single-photon detector.

7. The source as recited in claim 1, said source for the pair of photons further comprising a pulsed parametric down-conversion (PDC) source.

8. The source as recited in claim 1, said optical switch further comprising a polarizing beam splitter (PBS) and a Pockels cell that is used to rotate a polarization of a photon propagating in the storage loop based on a selectable electric state of the Pockels cell, wherein a polarizing beam splitter for a particular set of orthogonal polarizations transmits a photon that arrives on a particular input spatial mode with one polarization of the particular set onto one output spatial mode, and transmits a photon that arrives on the particular input spatial mode with a different polarization of the particular set onto a different output spatial mode.

9. The source as recited in claim 8, said input spatial mode comprising two input spatial modes of the polarizing beam splitter, wherein the two input spatial modes of the polarizing beam splitter comprise:
   a first beam-splitter input mode coupled to the optical coupler for receiving the second photon of the pair of photons from the source for the pair of photons, and
   a second beam-splitter input mode perpendicular to the first beam-splitter input mode for receiving a photon propagating in the storage loop.

10. The source as recited in claim 9, wherein said PBS is oriented to reflect the second photon arriving on the first beam-splitter mode into the loop mode.

11. The source as recited in claim 10, wherein said electronic processor is further configured to:
   set the first state on the Pockels cell so the Pockels cell rotates the polarization of the second photon during an initial pass of the second photon through the storage loop so that the second photon is transmitted by the PBS into the loop mode; and
   sets a second state of the Pockels cell so that the Pockels cell does not rotate the polarization of the second photon on zero or more subsequent passes through the storage loop so the photon is transmitted by the PBS into the loop mode on each of the zero or more subsequent passes.

12. The source as recited in claim 11, wherein when a photon is demanded from the source, said electronic processor sets a third state of the Pockels cell so that the Pockels cell rotates the polarization of the second photon during a last pass of the second photon through the storage loop so that the second photon is reflected by the PBS into a source output mode of the two output spatial modes, wherein the source output mode is different from the loop mode.

13. The source as recited in claim 1, said storage loop further comprising a lens to minimize a divergence of a path of the second photon through the storage loop.

14. A linear optics device for uses related to quantum computing, comprising a linear optics quantum logic gate connected to a plurality of sources of single photons, wherein each source of a single photon comprises:
- an optical switch with an optical input spatial mode and two optical output spatial modes, wherein a photon is directed to one of the two output spatial modes based on a selectable state of the optical switch;
- a storage loop for directing a photon from a loop mode of the two output spatial modes of the optical switch to the input spatial mode of the optical switch;
- a source for a pair of photons;
- a single-photon detector that outputs a detector electric signal when a photon is incident on the single-photon detector;
- an optical coupler that directs a first photon of the pair of photons to the single-photon detector and a second photon of the pair of photons to the input spatial mode of the optical switch; and
- an electronic processor connected to the single photon detector and the optical switch,
- wherein the electronic processor is configured for setting a first state of the optical switch based at least in part on the detector electric signal that is output from the single-photon detector.

15. A method for fabricating a source of a single photon for uses related to quantum computing, comprising:
- providing an optical switch with an optical input spatial mode and two optical output spatial modes, wherein a photon is directed to one of the two output spatial modes based on a selectable state of the optical switch;
- optically connecting a storage loop to the optical switch for directing a photon from a loop mode of the two output spatial modes of the optical switch to the input spatial mode of the optical switch;
- optically connecting an optical coupler to a source for a pair of photons and to the optical switch and to a single-photon detector, so that the coupler directs a first photon of the pair of photons to the single-photon detector and a second photon of the pair of photons to the input spatial mode of the optical switch; and
- electrically connecting an electronic processor to the single photon detector and the optical switch, wherein the electronic processor is configured for setting a first electric state of the optical switch based at least in part on a detector electric signal that is output from the single-photon detector when a photon is incident on the single-photon detector.

16. A method for generating a single photon for uses related to quantum computing, comprising the steps of:
- receiving a first photon of a pair of photons from a source of pairs of photons onto a single-photon detector that generates a detector electric signal when a photon is incident on the single-photon detector;
- setting a first state of an optical switch based at least in part on the detector electric signal that is output from the single-photon detector, which first state causes the optical switch to direct a photon received on an optical input spatial mode to a first output spatial mode of two output spatial modes;
- receiving a second photon of the pair on the optical input spatial mode;
- directing the second photon from the optical switch through the first output spatial mode into a storage loop that returns the second photon to the optical switch after the second photon passes through the storage loop.

17. The method as recited in claim 16, further comprising the steps of:
- determining whether the second photon is demanded; and
- if it is determined that the second photon is not demanded, then setting a second state of the optical switch to direct the second photon through the first output spatial mode back into the storage loop.

18. The method as recited in claim 17, further comprising, if it is determined that the second photon is demanded, then performing the step of setting a third state of the optical switch to direct the second photon through a different second mode of the two output spatial modes.

* * * * *